United States Patent
Kim

(10) Patent No.: US 11,500,974 B2
(45) Date of Patent: Nov. 15, 2022

(54) METHOD FOR USER AUTHENTICATION OF VEHICLE IN AUTONOMOUS DRIVING SYSTEM AND APPARATUS THEREOF

(71) Applicant: LG ELECTRONICS INC., Seoul (KR)

(72) Inventor: Soryoung Kim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 691 days.

(21) Appl. No.: 16/557,762

(22) Filed: Aug. 30, 2019

(65) Prior Publication Data

US 2020/0074061 A1    Mar. 5, 2020

(30) Foreign Application Priority Data

Aug. 8, 2019 (KR) .......................... 10-2019-0096744

(51) Int. Cl.
    *G06F 21/32* (2013.01)
    *B60R 25/24* (2013.01)
    (Continued)

(52) U.S. Cl.
    CPC ............ *G06F 21/32* (2013.01); *B60R 25/102* (2013.01); *B60R 25/24* (2013.01); *B60R 25/241* (2013.01);
    (Continued)

(58) Field of Classification Search
    CPC ....... G06F 21/32; B60R 25/102; B60R 25/24; B60R 25/241; B60R 25/25;
    (Continued)

(56) References Cited

U.S. PATENT DOCUMENTS 6,636,145 B1 * 10/2003 Murakami ............. G07B 15/00
                                                              340/5.9
2017/0008490 A1 * 1/2017 Sako .................. G07C 9/00571
(Continued)

FOREIGN PATENT DOCUMENTS

JP          2016115364          6/2016
JP          2019038420          3/2019
(Continued)

OTHER PUBLICATIONS

Korean Intellectual Property Office Application No. 10-2019-0096744, Notice of Allowance dated May 22, 2020, 2 pages.

*Primary Examiner* — Edwin C Holloway, III
(74) *Attorney, Agent, or Firm* — Lee, Hong, Degerman, Kang & Waimey PC

(57) ABSTRACT

A method and an apparatus for user authentication of a vehicle in an autonomous driving system are disclosed. The method includes determining an authentication value indicating matching accuracy of authentication data entered for a passenger of the vehicle and authentication information of a caller of the vehicle, determining a driving setting of the vehicle based on the authentication value, driving on a pre-driving route according to the driving setting, performing decryption for encrypted data blocks related to the passenger received from an infra apparatus located on the pre-driving route, using a key value of the passenger, determining a destination of the vehicle based on whether the decryption for the encrypted data blocks succeeds or fails, and controlling the vehicle to drive to the destination. An autonomous vehicle of the present invention can be associated with artificial intelligence modules, drones (unmanned aerial vehicles (UAVs)), robots, augmented reality (AR) devices, virtual reality (VR) devices, devices related to 5G service, etc.

20 Claims, 25 Drawing Sheets

(51) Int. Cl.
*B60R 25/25* (2013.01)
*B60R 25/102* (2013.01)
*B60W 40/08* (2012.01)
*H04L 9/32* (2006.01)
*G05D 1/00* (2006.01)

(52) U.S. Cl.
CPC ............. *B60R 25/25* (2013.01); *B60W 40/08* (2013.01); *H04L 9/3231* (2013.01); *B60R 2325/108* (2013.01); *B60W 2040/0809* (2013.01); *H04L 2209/84* (2013.01)

(58) Field of Classification Search
CPC ........... B60R 2325/108; B60R 16/023; B60W 40/08; B60W 2040/0809; B60W 30/14; B60W 2050/0005; B60W 50/082; B60W 50/14; B60W 60/001; B60W 60/0053; B60W 2040/0872; B60W 2556/45; B60W 2540/043; B60W 2540/045; H04L 9/3231; H04L 2209/84; H04L 9/0891; H04L 9/3239; H04L 9/50; B60K 2370/11
USPC ........................................................ 713/186
See application file for complete search history.

(56) References Cited

U.S. PATENT DOCUMENTS

| 2017/0015318 | A1* | 1/2017 | Scofield | H04L 67/02 |
| 2018/0374002 | A1* | 12/2018 | Li | G06Q 10/02 |
| 2019/0061688 | A1* | 2/2019 | Watanabe | B60R 25/2018 |
| 2019/0384320 | A1* | 12/2019 | Lee | B60W 60/001 |
| 2020/0033887 | A1* | 1/2020 | Kim | H04W 12/10 |
| 2020/0223396 | A1* | 7/2020 | Yi | B60R 25/252 |
| 2020/0307610 | A1* | 10/2020 | Lerner | G07C 5/008 |
| 2020/0406859 | A1* | 12/2020 | Hassani | H04L 9/3213 |
| 2021/0188289 | A1* | 6/2021 | Oba | B60W 50/082 |
| 2021/0362727 | A1* | 11/2021 | Kim | G06Q 50/30 |

FOREIGN PATENT DOCUMENTS

| KR | 1020180053081 | 5/2018 |
| KR | 1020180071046 | 6/2018 |
| KR | 102005177 | 7/2019 |

* cited by examiner

[FIG. 1]
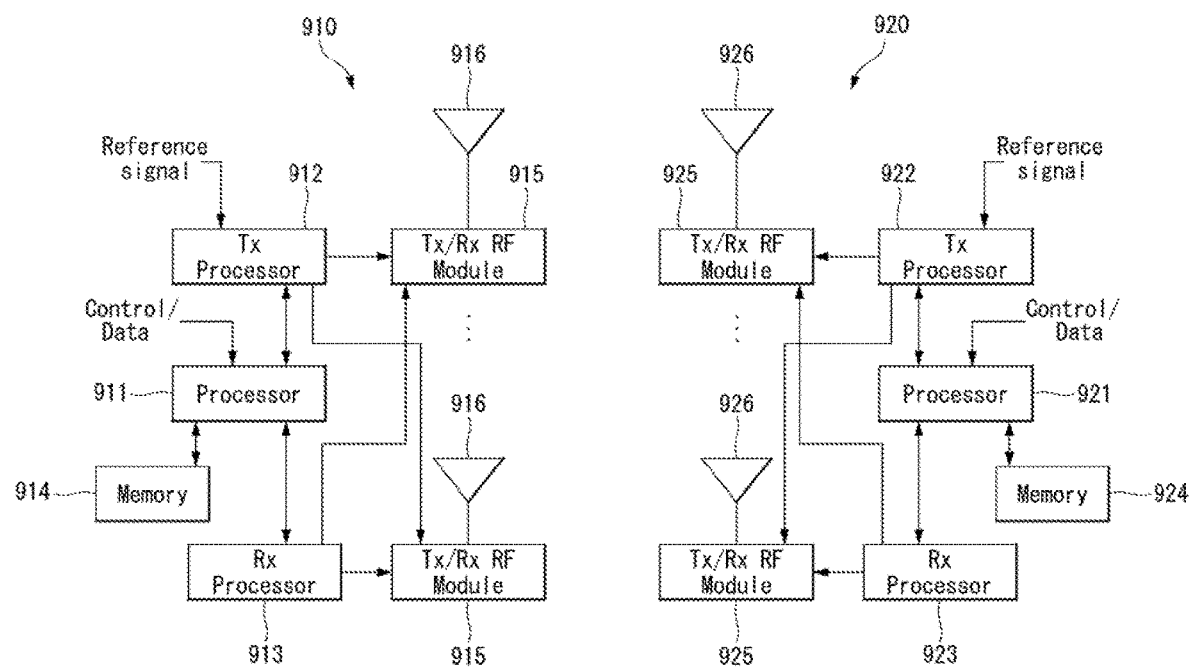

[FIG. 2]
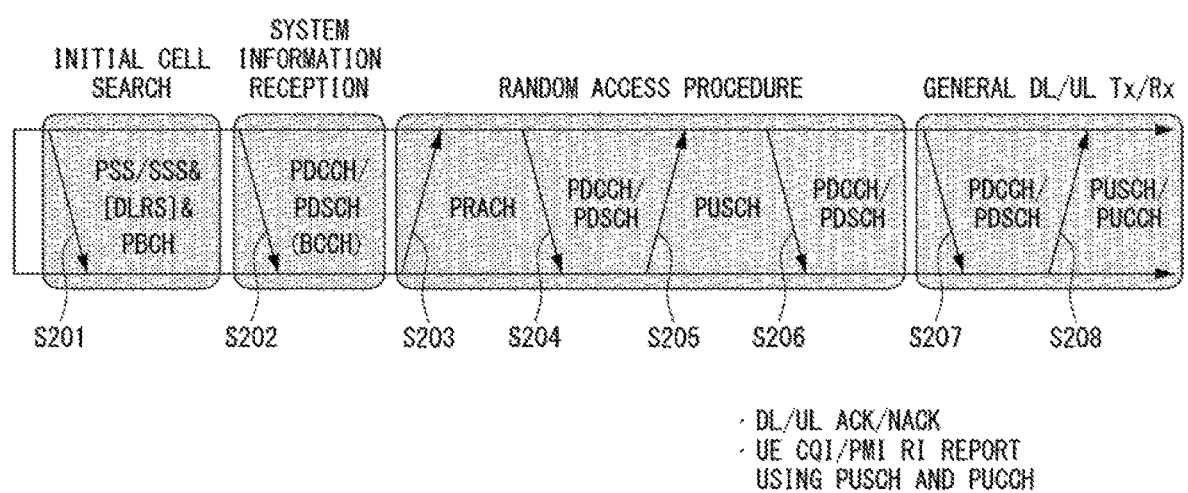

[FIG. 3]
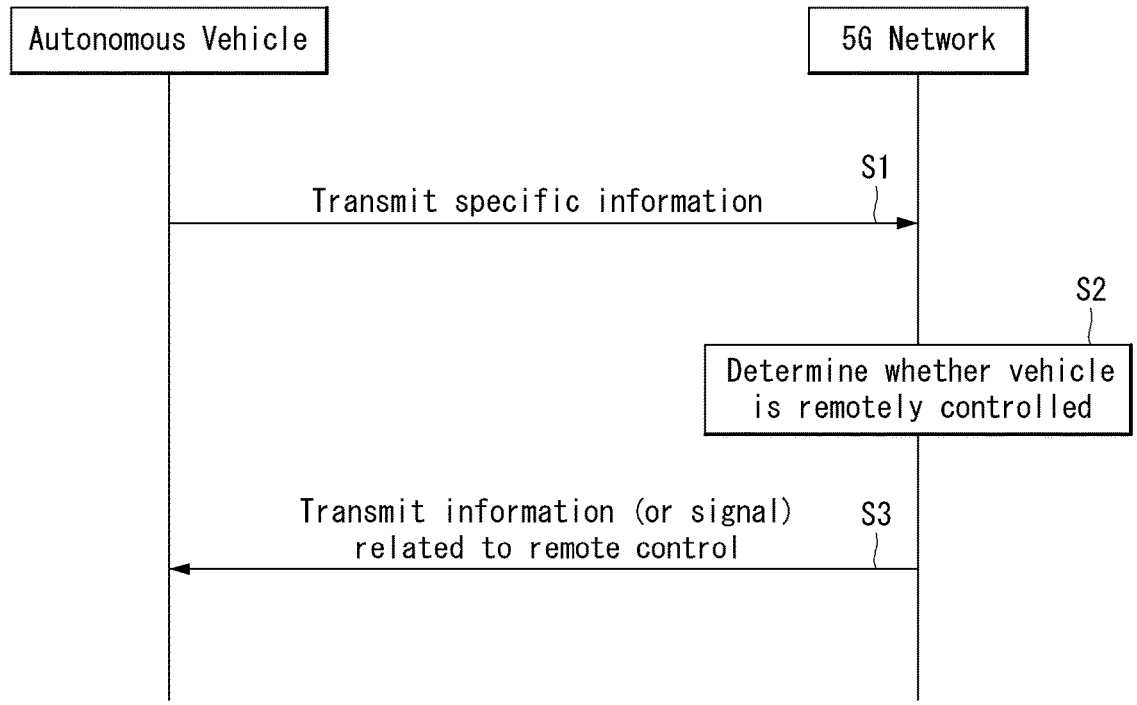
[FIG. 4]
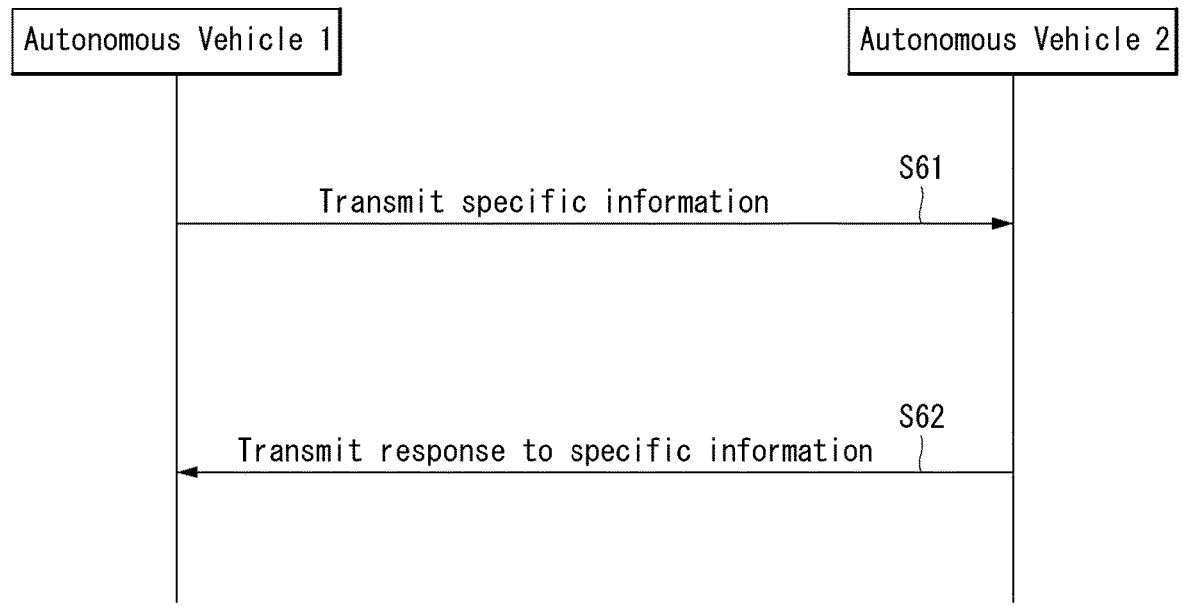

[FIG. 5]
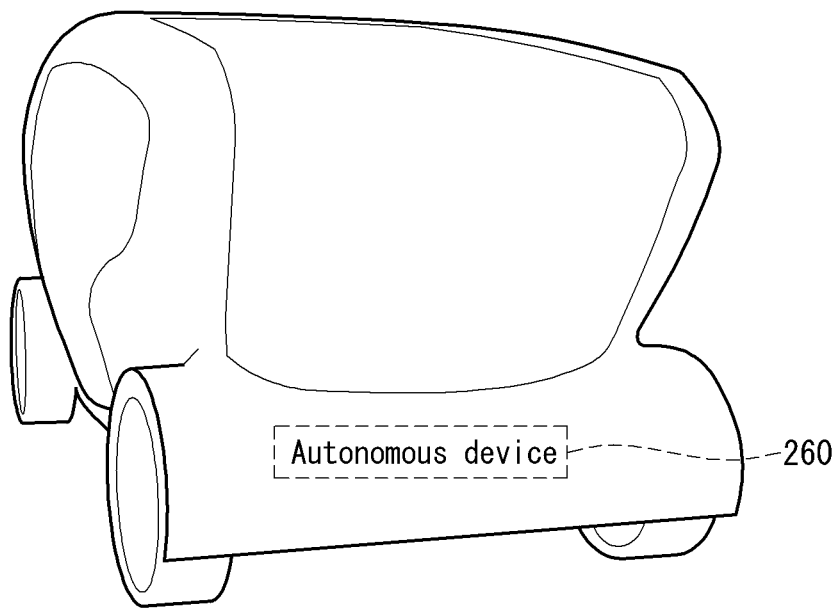
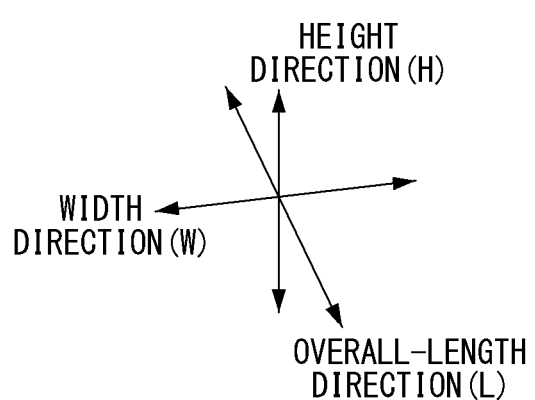

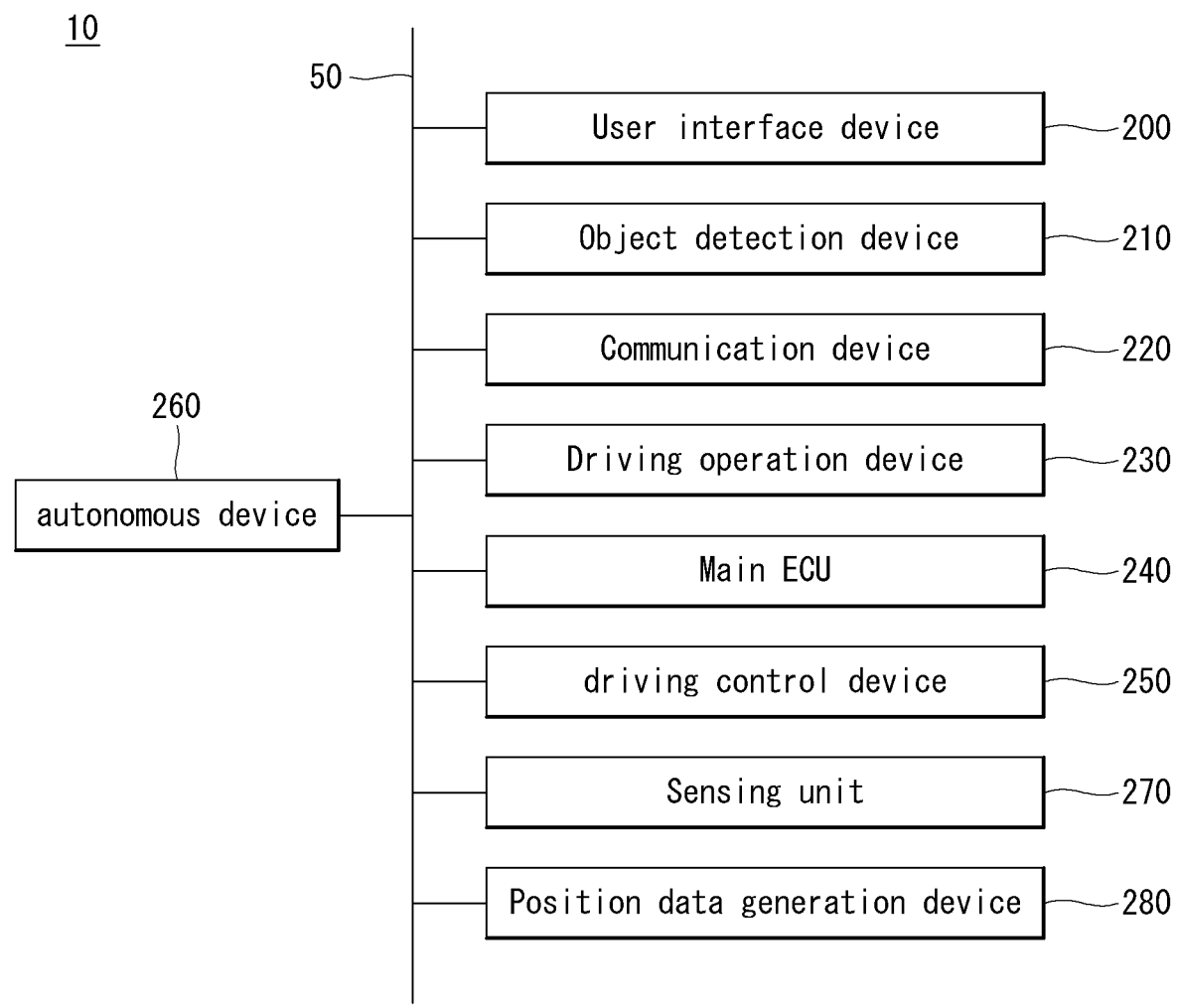
[FIG. 6]

[FIG. 7]
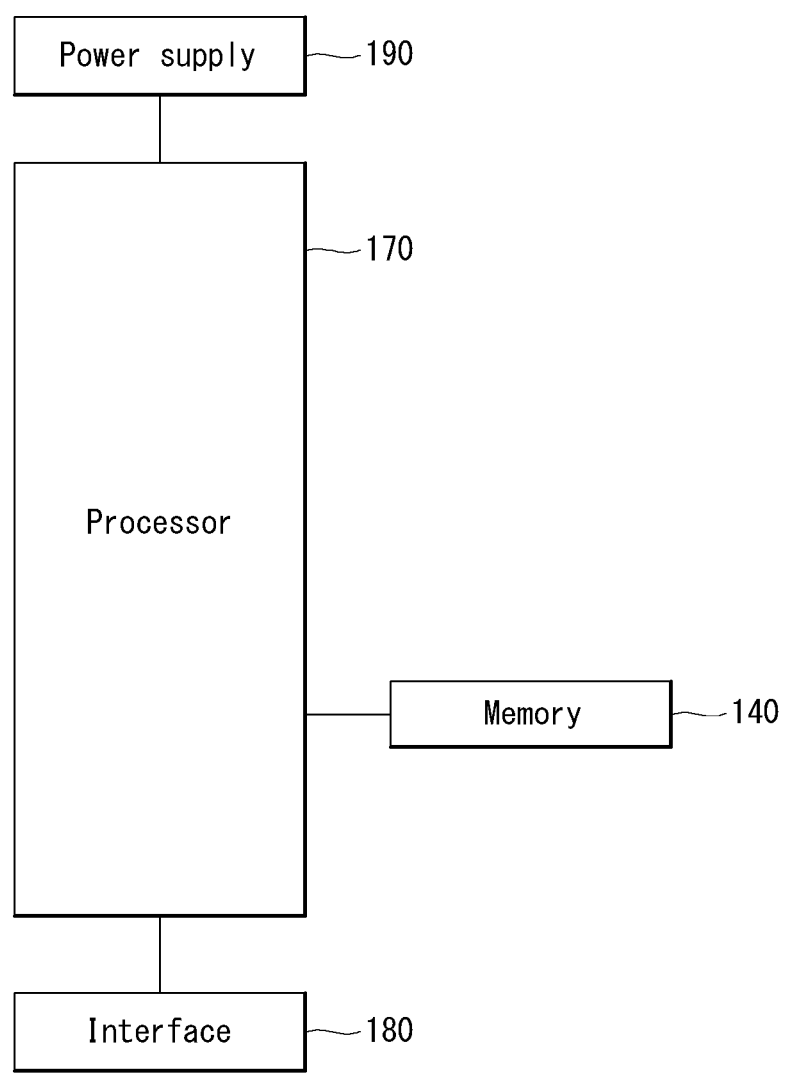

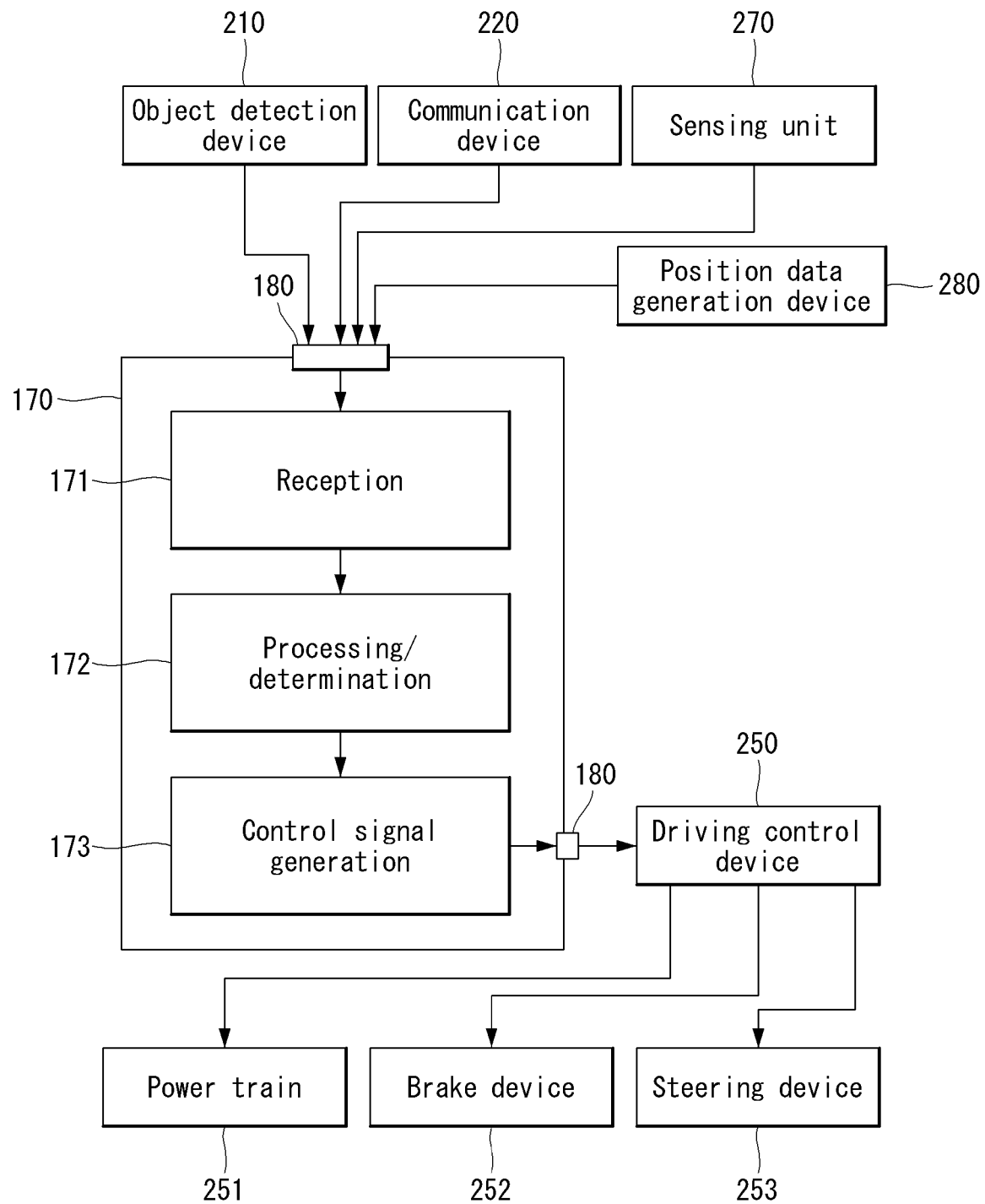
[FIG. 8]

[FIG. 9]
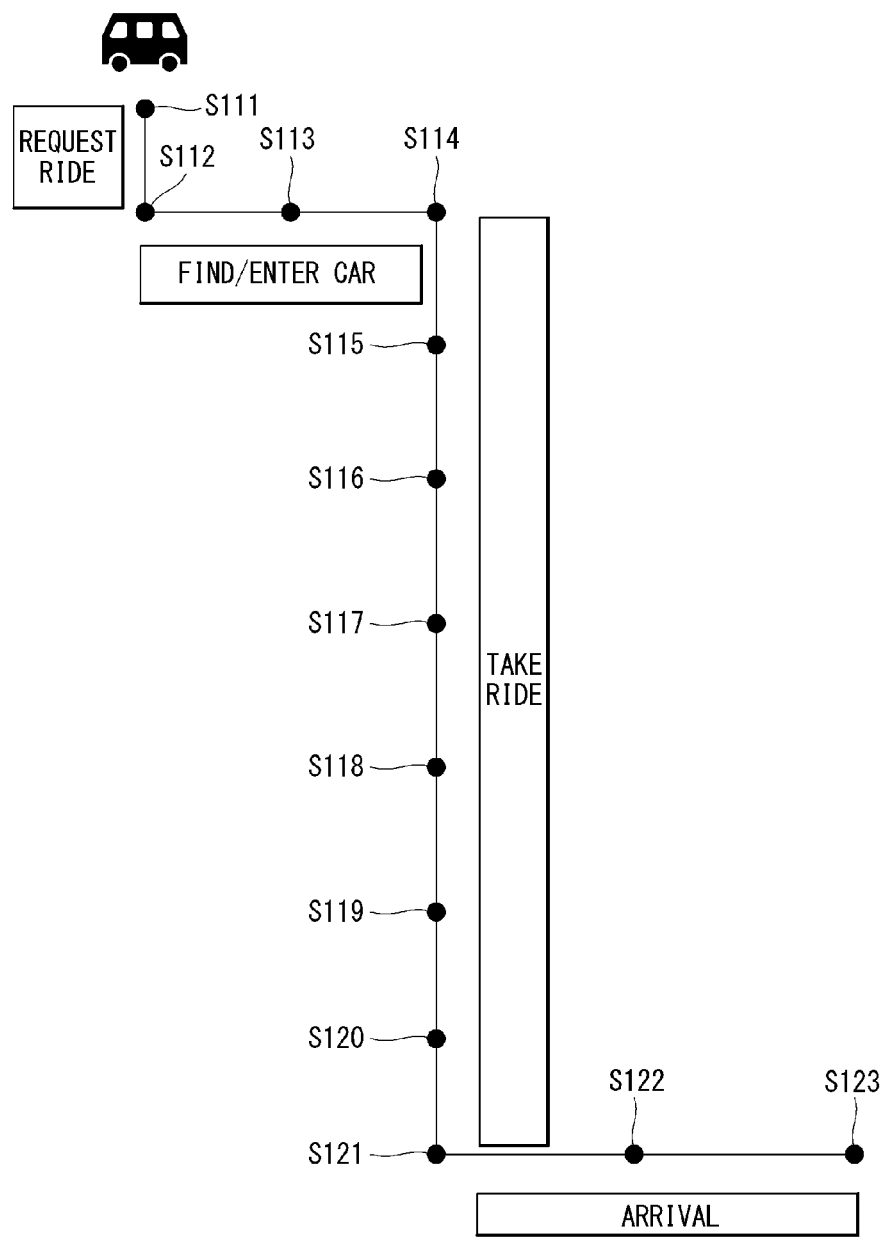

[FIG. 10]
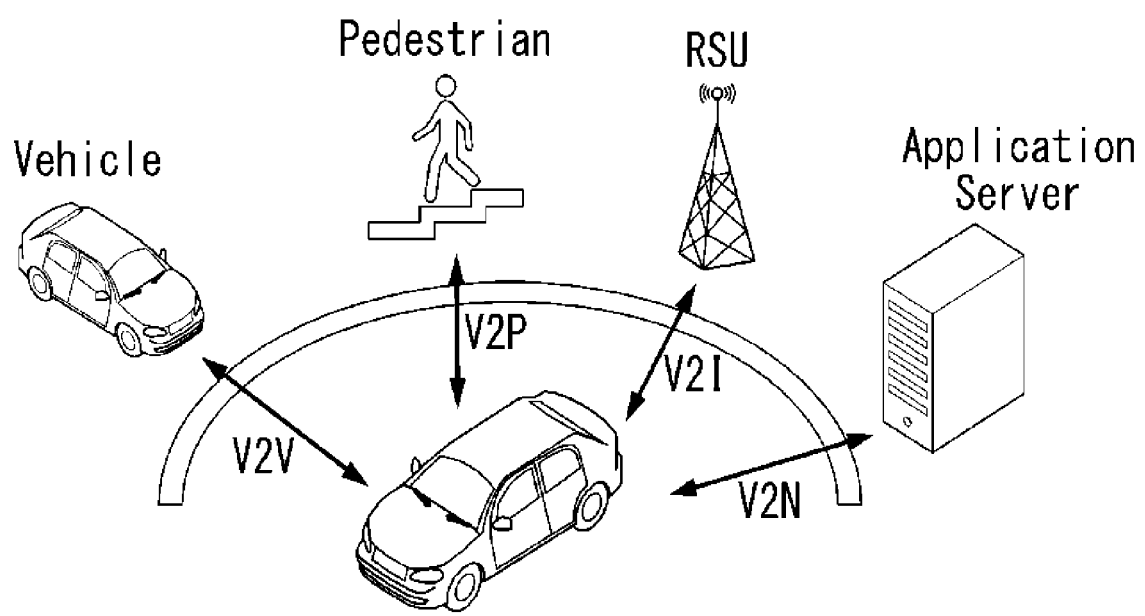

[FIG. 11]
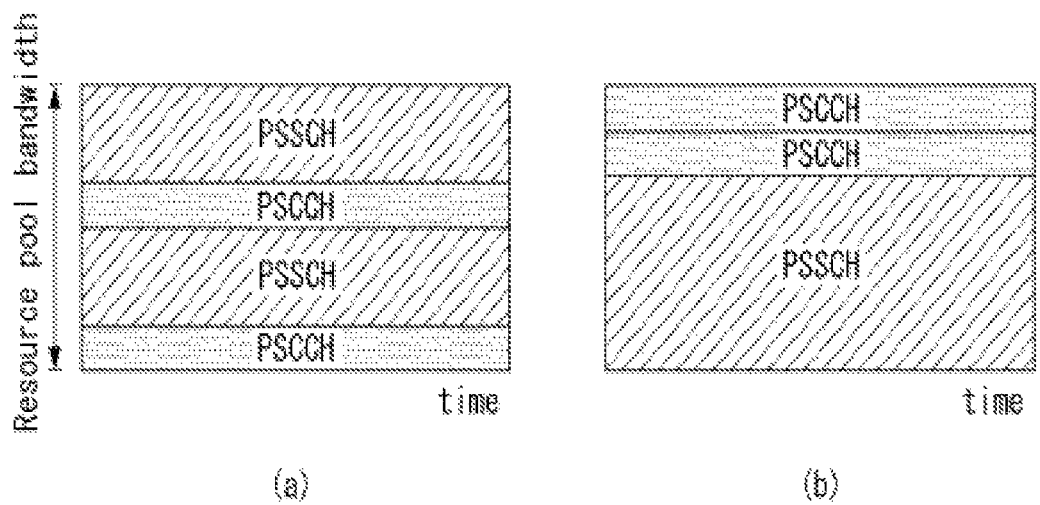

[FIG. 12]
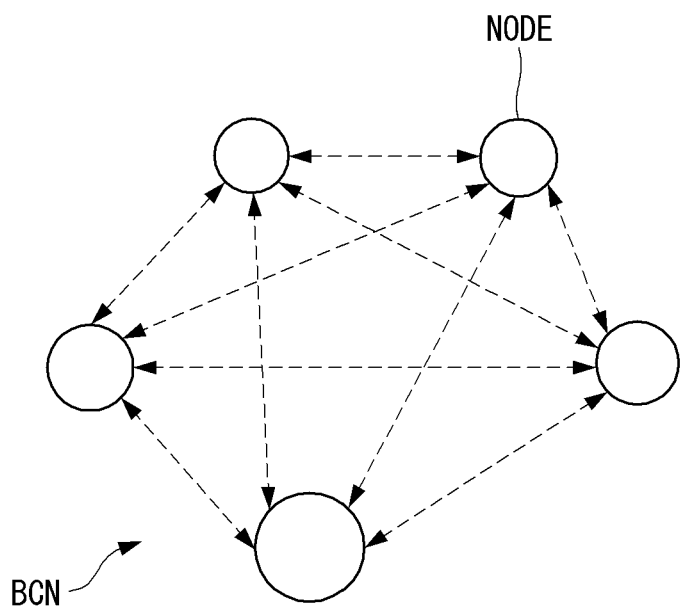

[FIG. 13]
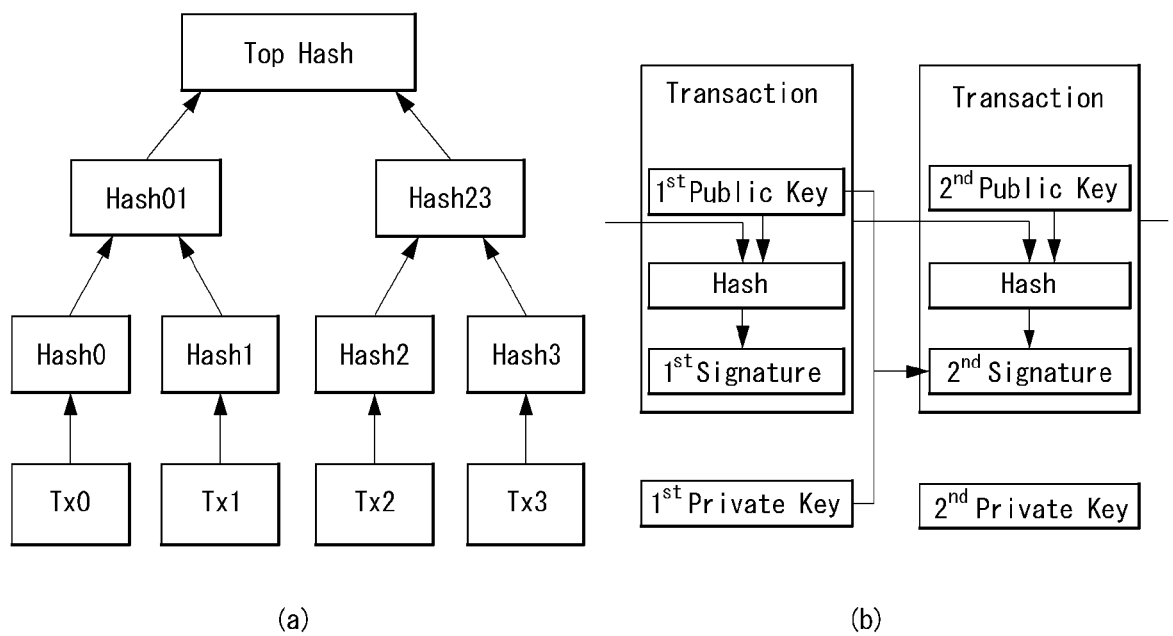
(a)　　　　　　　　　　　　(b)

【FIG. 14】
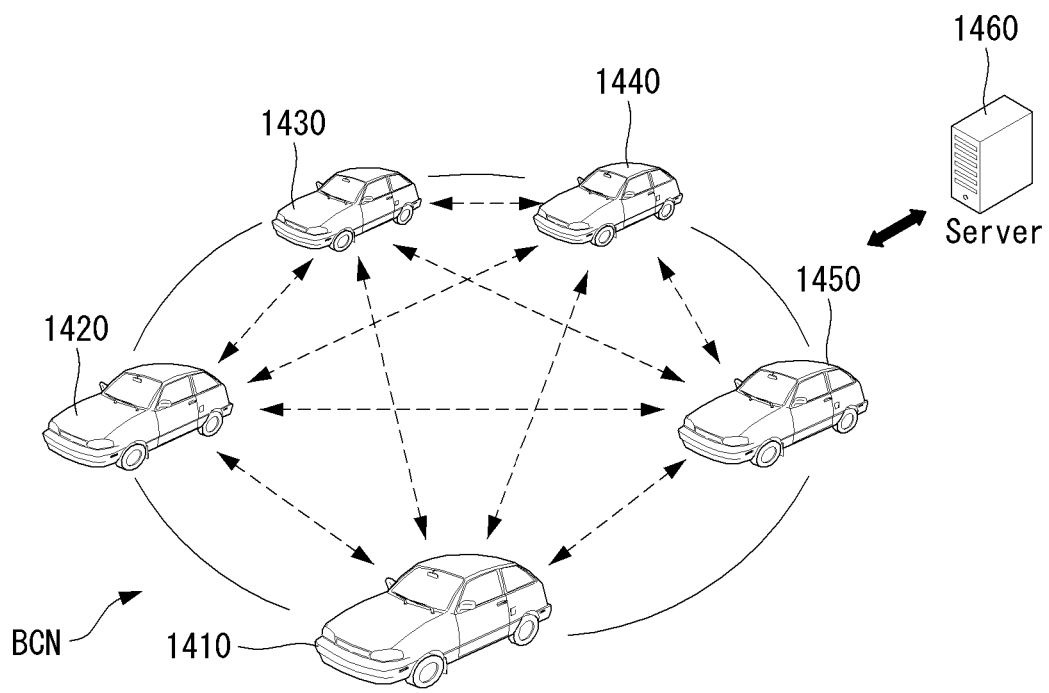

[FIG. 15]
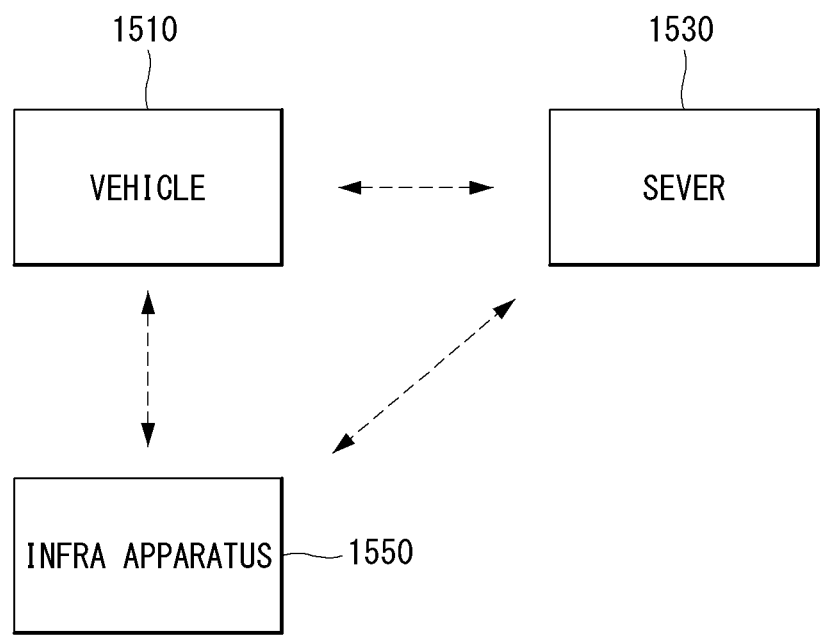

[FIG. 16]
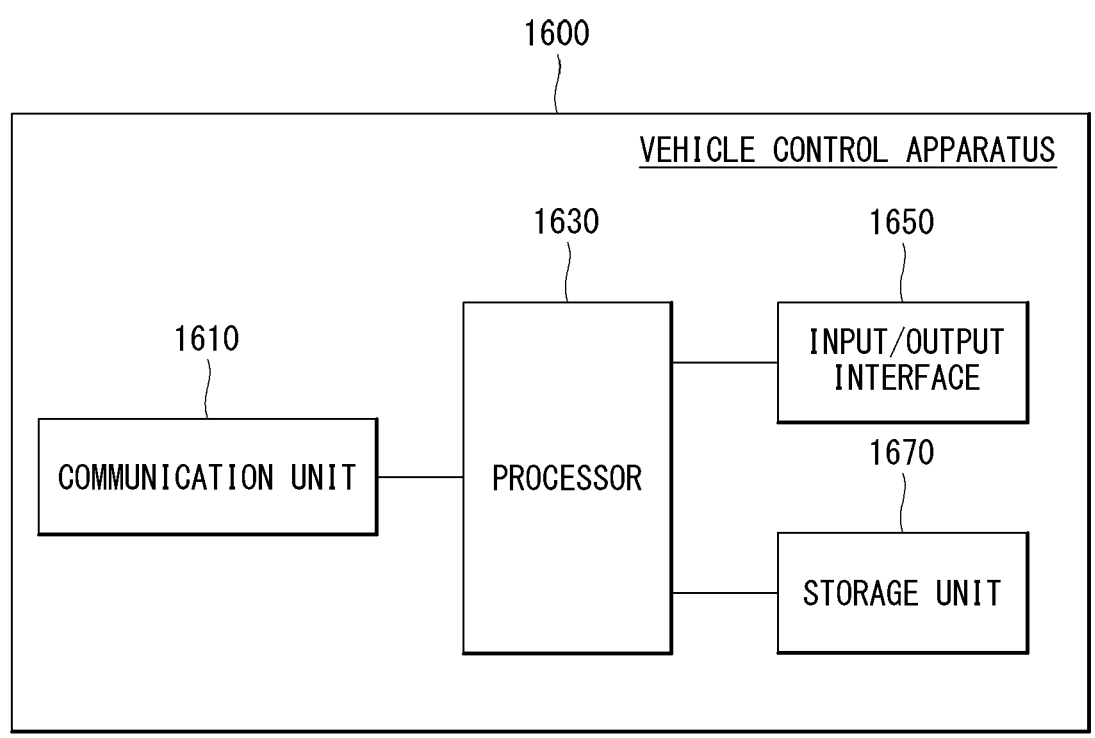

[FIG. 17]
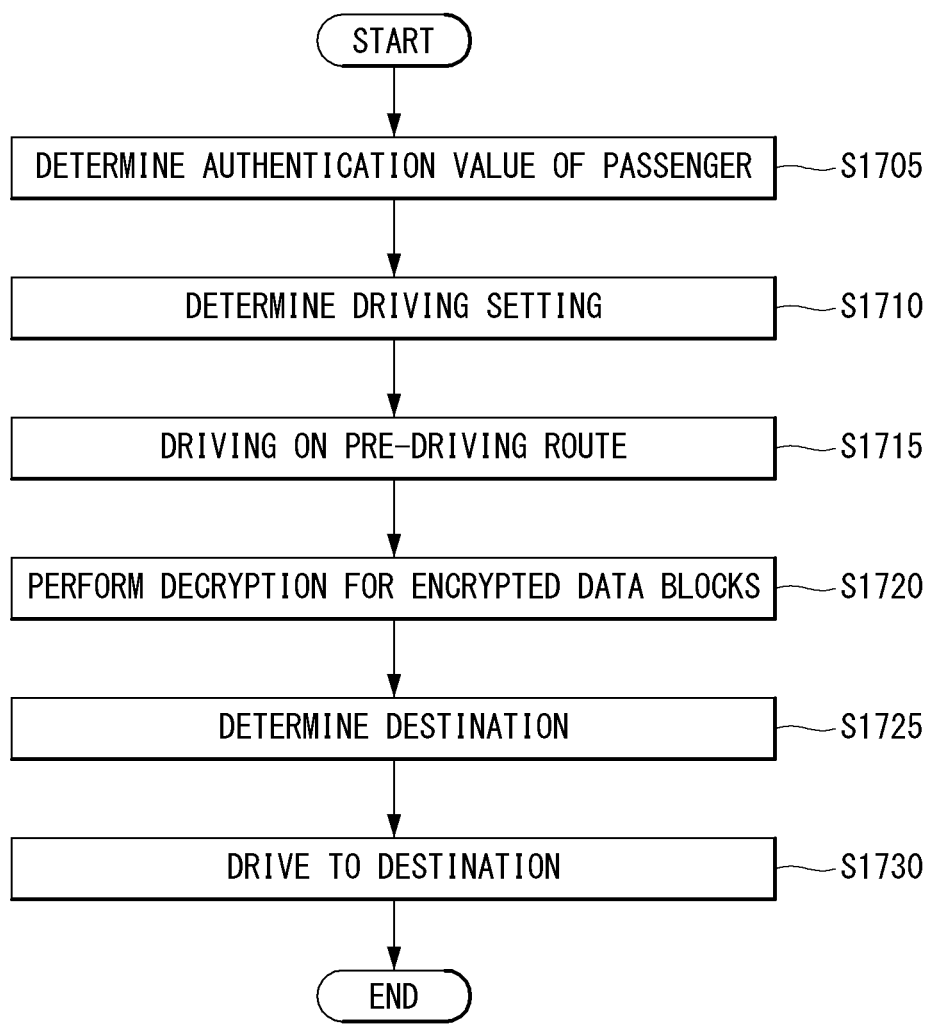

[FIG. 18]
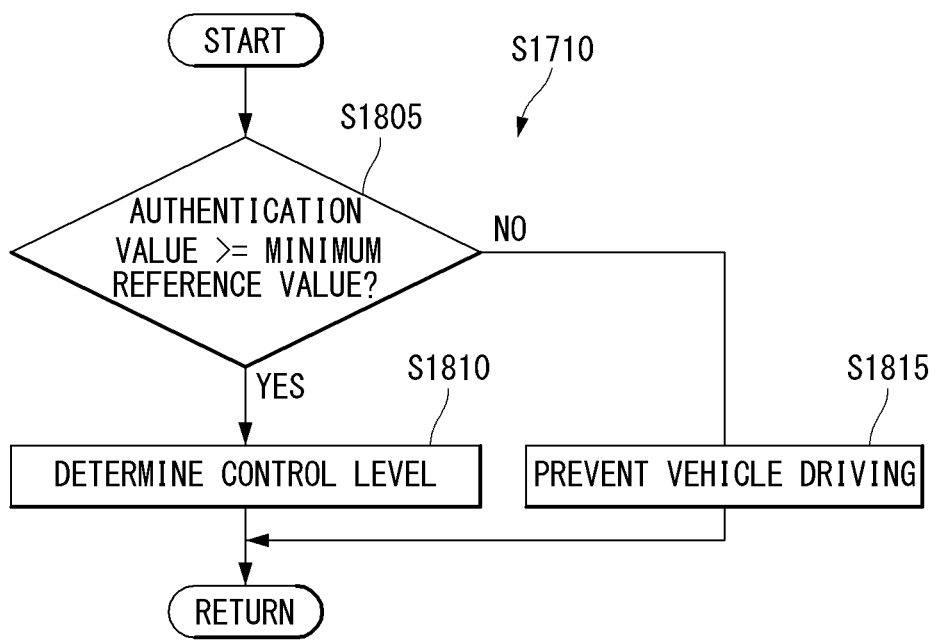

[FIG. 19]
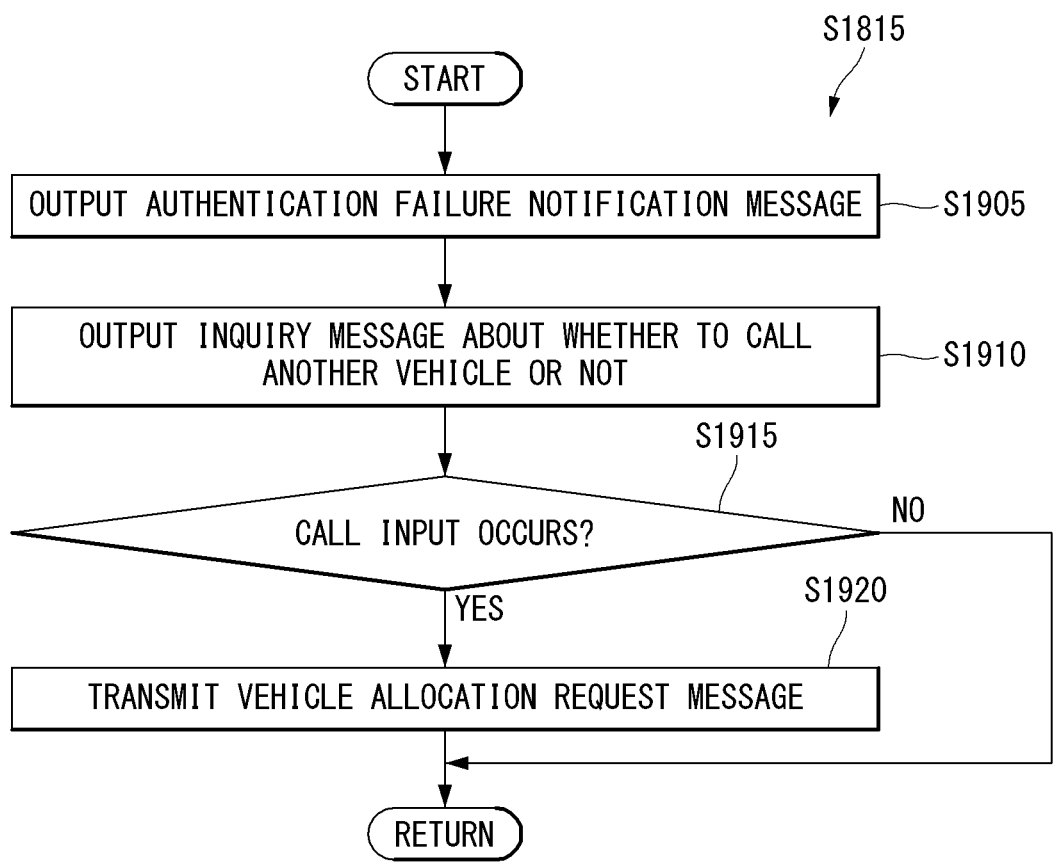

[FIG. 20]
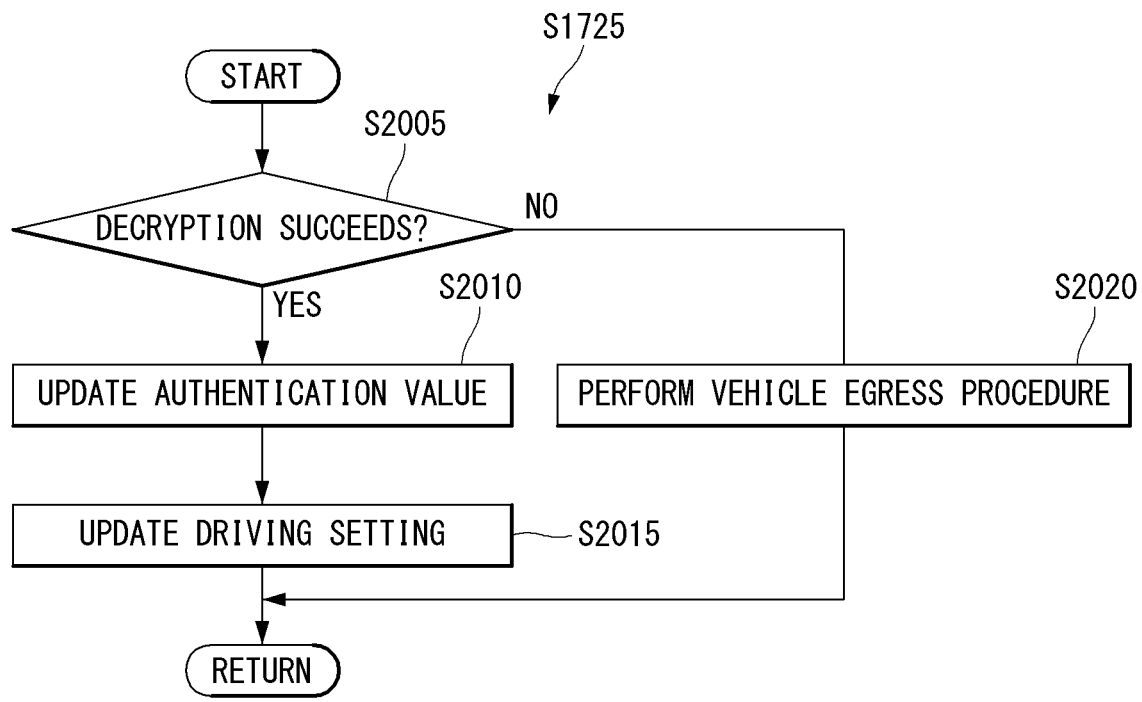

[FIG. 21A]
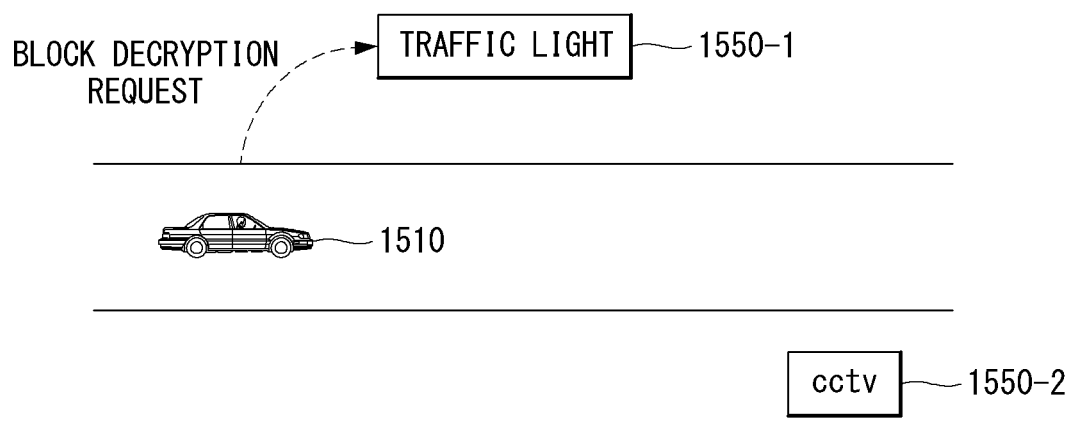
[FIG. 21B]
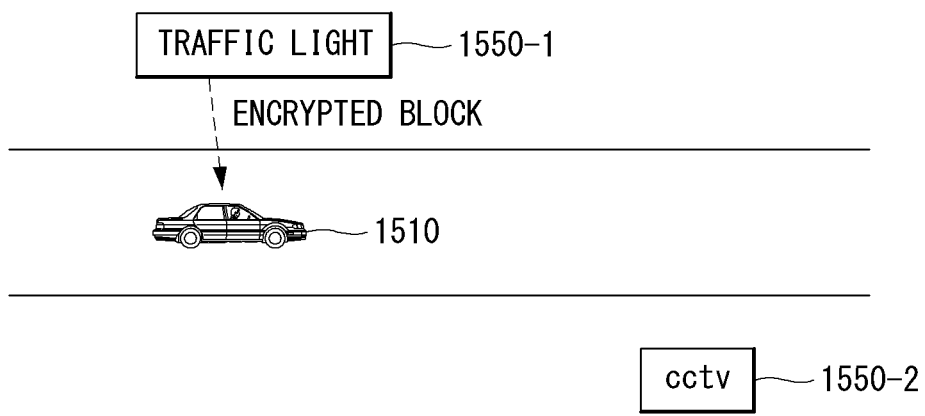

[FIG. 21C]
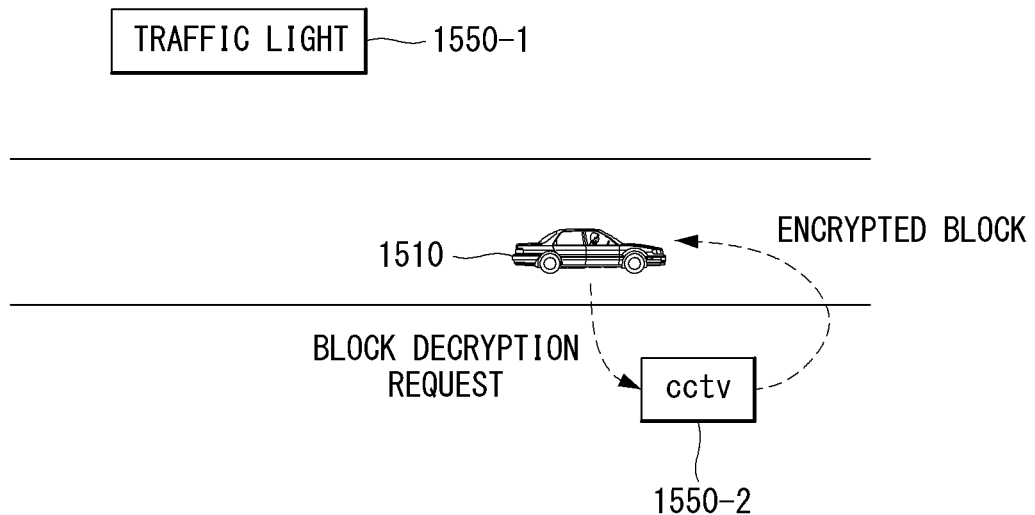
[FIG. 22]
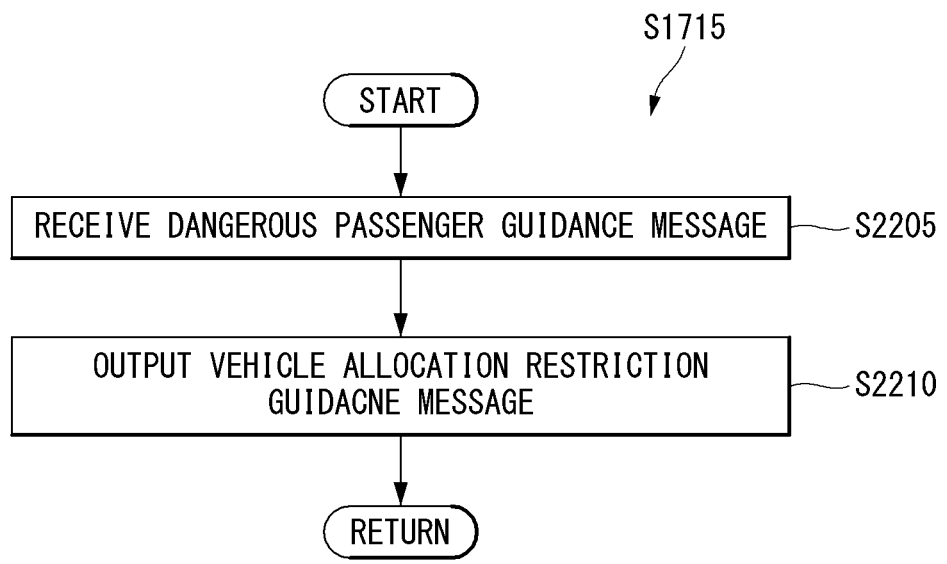

[FIG. 23]
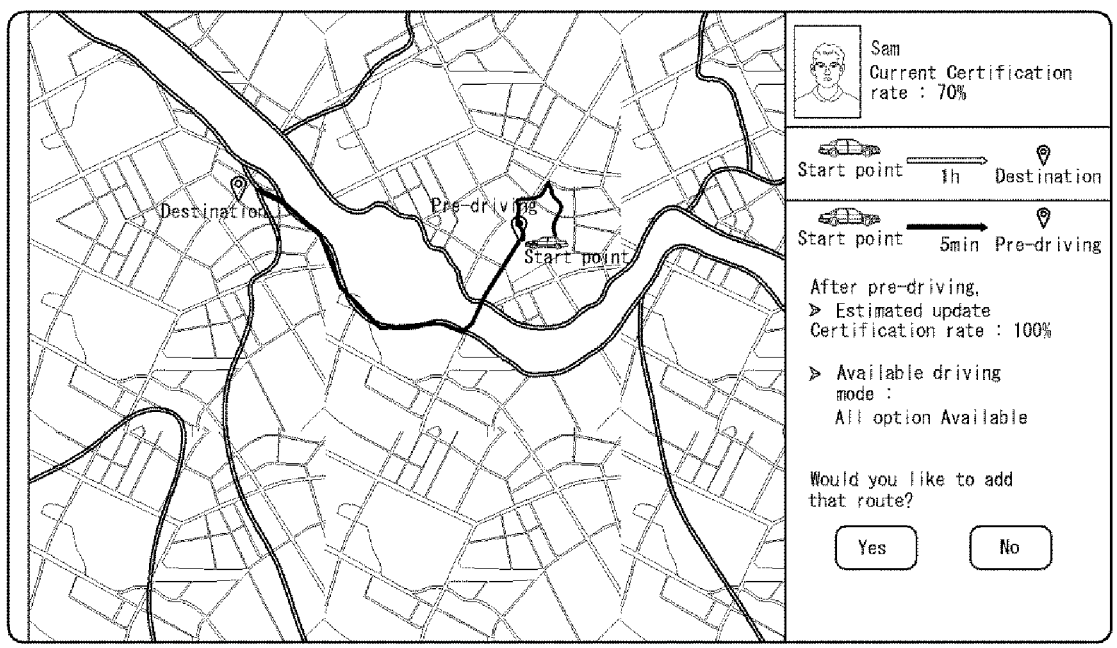

[FIG. 24]
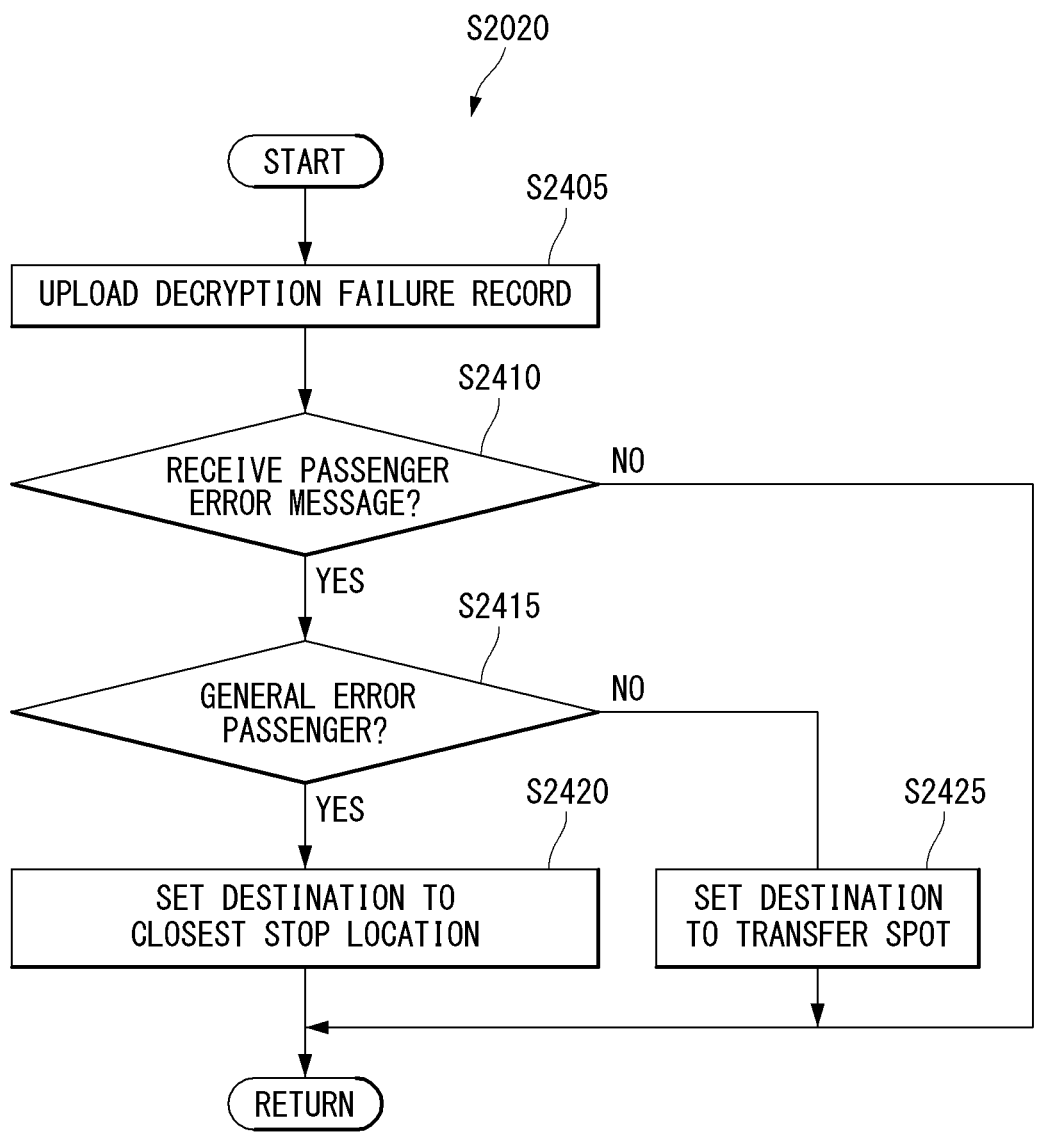

[FIG. 25]
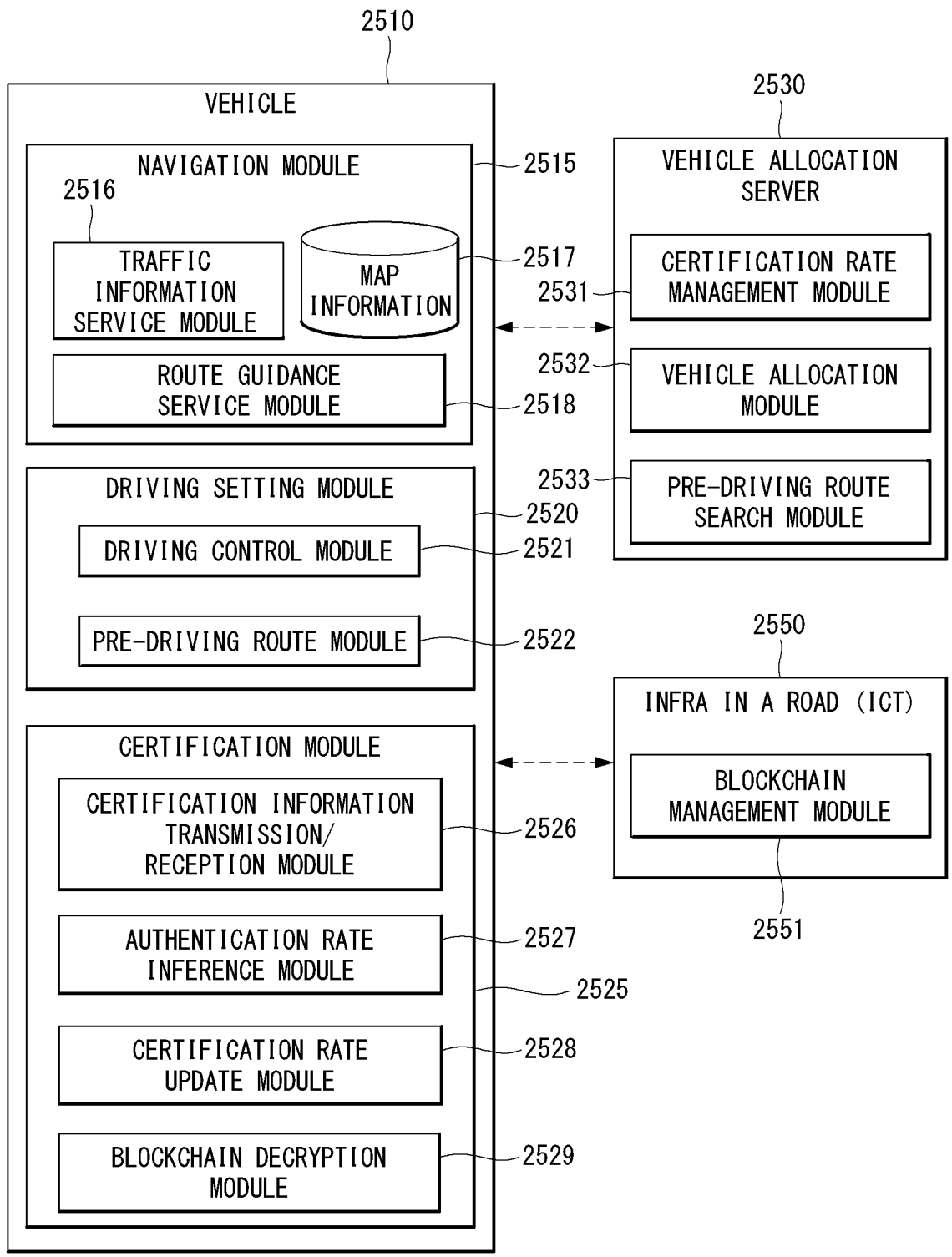

[FIG. 26]
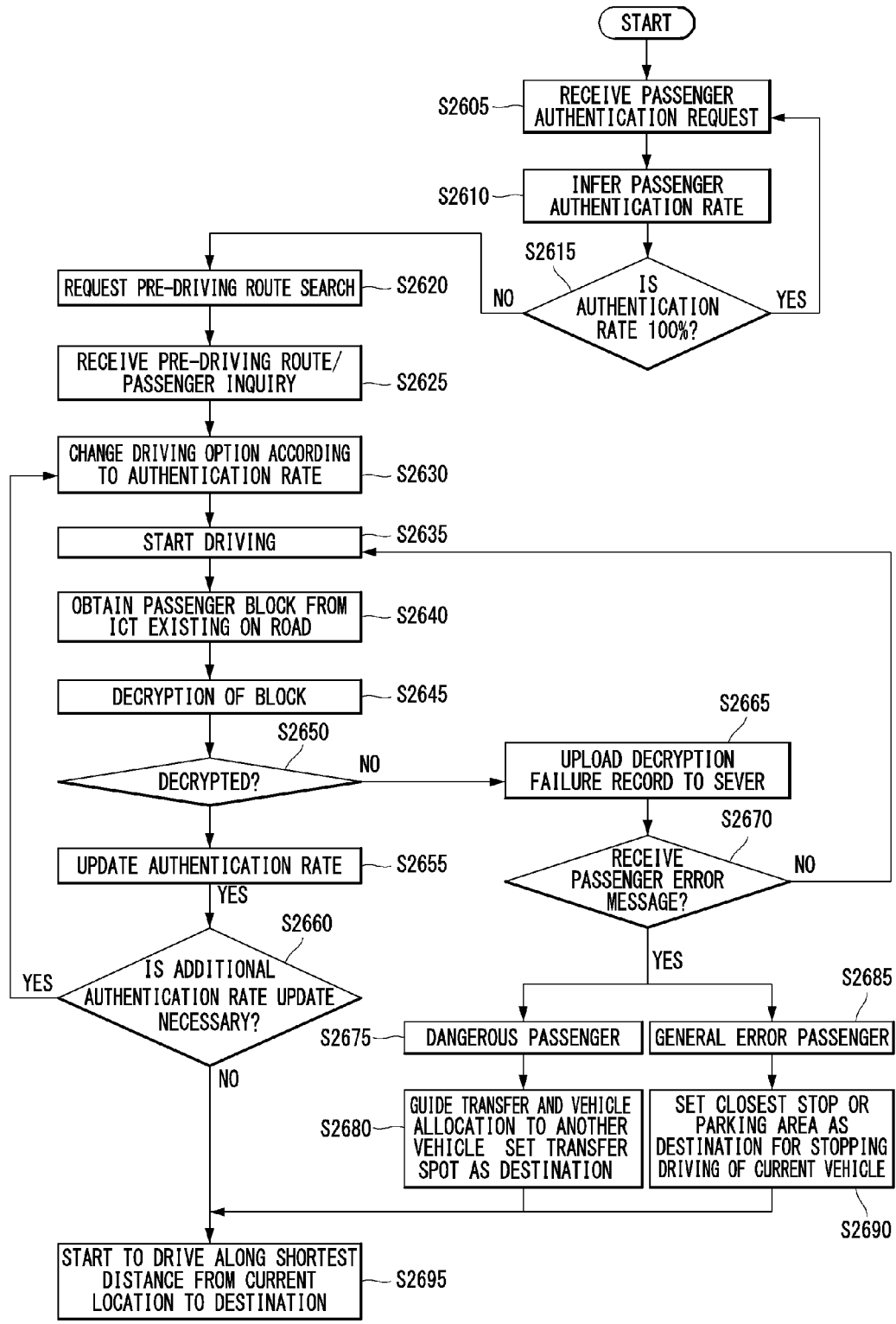

METHOD FOR USER AUTHENTICATION OF VEHICLE IN AUTONOMOUS DRIVING SYSTEM AND APPARATUS THEREOF

CROSS-REFERENCE TO RELATED APPLICATIONS

Pursuant to 35 U.S.C. § 119(a), this application claims the benefit of earlier filing date and right of priority to Korean Patent Application No. 10-2019-0096744, filed on Aug. 8, 2019, the contents of which are hereby incorporated by reference herein in its entirety.

BACKGROUND OF THE INVENTION

Field of the Invention

The invention relates to a method for user authentication in autonomous driving system and apparatus thereof, and more particularly to a method for performing user authentication, using a blockchain technology in an autonomous driving system, and an apparatus thereof.

Related Art

Vehicles can be classified into an internal combustion engine vehicle, an external composition engine vehicle, a gas turbine vehicle, an electric vehicle, etc. according to types of motors used therefor.

An autonomous vehicle refers to a self-driving vehicle that can travel without an operation of a driver or a passenger, and Autonomous Driving Systems refer to systems that monitor and control the autonomous vehicle such that the autonomous vehicle can perform self-driving.

SUMMARY OF THE INVENTION

The invention has been made in an effort to address aforementioned necessities and/or problems.

Further, the disclosure is directed to embodying a method for user authentication of high accuracy in an autonomous driving system and an apparatus thereof.

Furthermore, the disclosure is directed to embodying a method for user authentication capable of storing user information safely in an autonomous driving system and an apparatus thereof.

According to an embodiment of the invention, there is provided a method for user authentication of a vehicle in an autonomous system, which includes: determining an authentication value indicating matching accuracy of authentication data entered for a passenger of the vehicle and authentication information of a caller of the vehicle; determining a driving setting of the vehicle based on the authentication value;

driving on a pre-driving route according to the driving setting; performing decryption for encrypted data blocks related to the passenger received from an infra apparatus located on the pre-driving route, using a key value of the passenger; determining a destination of the vehicle based on whether the decryption for the encrypted data blocks succeeds or fails; and driving to the destination.

Additionally, the authentication value may correspond to an average of matching rates for each authentication item of the authentication data entered of the passenger and the authentication information of the caller, and the authentication item may include face recognition information, living body authentication information or financial authentication information.

Additionally, the determining of the driving setting may include: comparing the authentication value with a minimum reference value for determining whether the vehicle is allows to drive or not, determining a control level corresponding to the authentication value if the authentication value is equal to or greater than the minimum reference value, and preventing the vehicle from driving if the authentication value is less than the minimum reference value.

Additionally, the preventing of the vehicle from driving may include: outputting an authentication failure notification message notifying authentication failure of the passenger, outputting an inquiry message about whether to call another vehicle or not, determining whether an input requesting another vehicle occurs or not, and transmitting to a server a vehicle allocation request message requesting a call of a substitute vehicle if the input requesting a substitute vehicle occurs.

Additionally, the determining of the destination of the vehicle based on whether the decryption for the encrypted data blocks succeeds or fails may include: determining whether decryption of the data blocks succeeds or fails, using a key value of the passenger, updating the authentication value, using a use record of the passenger contained in the data blocks, and updating the driving setting, using the authentication value updated, if the decryption succeeds, and performing a vehicle egress procedure of the passenger if the decryption fails.

Additionally, the updating of the driving setting may include: determining an updated control level corresponding to the updated authentication value, and setting as the destination a location designated by the passenger according to the updated control level.

Additionally, the driving setting may indicate setting of a subset of driving functions of the vehicle on which manipulation of the driver is controlled, and the driving functions may include manual driving, speed control, cutting in, maintaining a safe distance, or determining priority in an entry/exit section.

Additionally, the performing of the vehicle egress procedure may include: uploading a failure record of the decryption to a server, determining whether a passenger error message indicating the type of the passenger is received from the server, checking the type of the passenger contained in the passenger error message when receiving the passenger error message, setting the destination to a stop location closest to a location of the vehicle if the passenger corresponds to the general error passenger, and setting the destination to a transfer spot where it is possible to board another vehicle if the passenger corresponds to the dangerous passenger.

Additionally, the setting of the destination to a transfer spot where it is possible to board another vehicle may include outputting a vehicle allocation restriction guidance message informing vehicle allocation restriction for the passenger.

Additionally, the vehicle allocation restriction guidance message may be generated when a number of times of decryption failure of vehicles which the passenger has boarded is greater than a reference number of times.

According to another embodiment of the invention, there is provided an apparatus for user authentication of a vehicle in an autonomous system, which includes: a communication unit which transmits or receives a signal of a vehicle; a processor combined with the communication unit; an input/ output interface unit combined with the processor; and a storage unit combined with the processor, wherein the processor is set to determine an authentication value indicating matching accuracy of authentication data entered for a passenger of the vehicle and authentication information of a caller of the vehicle, determine a driving setting of the vehicle based on the authentication value, control the vehicle to drive on a pre-driving route according to the driving setting, perform decryption for encrypted data blocks related to the passenger received from an infra apparatus located on the pre-driving route, using a key value of the passenger, determine a destination of the vehicle based on whether the decryption for the encrypted data blocks succeeds or fails, and control the vehicle to drive to the destination.

BRIEF DESCRIPTION OF THE DRAWINGS

Accompanying drawings included as a part of the detailed description for helping understand the present invention provide embodiments of the present invention and are provided to describe technical features of the present invention with the detailed description.

FIG. 1 is a block diagram of a wireless communication system to which methods proposed in the disclosure are applicable.

FIG. 2 shows an example of a signal transmission/reception method in a wireless communication system.

FIG. 3 shows an example of basic operations of an autonomous vehicle and a 5G network in a 5G communication system.

FIG. 4 shows an example of a basic operation between vehicles using 5G communication.

FIG. 5 illustrates a vehicle according to an embodiment of the present invention.

FIG. 6 is a control block diagram of the vehicle according to an embodiment of the present invention.

FIG. 7 is a control block diagram of an autonomous device according to an embodiment of the present invention.

FIG. 8 is a diagram showing a signal flow in an autonomous vehicle according to an embodiment of the present invention.

FIG. 9 is a diagram referred to describe a usage scenario of a user according to an embodiment of the present invention.

FIG. 10 is an example of V2X communication to which the present invention is applicable.

FIG. 11 shows a resource allocation method in a side-link where the V2X is used.

FIG. 12 is a drawing schematically showing a blockchain.

FIG. 13 is a drawing representing a Muckle Tree method in blockchain encryption technology and is a drawing illustrating a digital signature method based on a public key in the blockchain encryption technology.

FIG. 14 is a drawing showing blockchain with an autonomous vehicle as a node.

FIG. 15 shows an example of an autonomous driving system according to an exemplary embodiment of the invention.

FIG. 16 shows an example of functional block diagram of a vehicle control apparatus in an autonomous driving system according to an exemplary embodiment of the invention.

FIG. 17 is a flowchart for the user authentication in an autonomous driving system according to an exemplary embodiment of the invention.

FIG. 18 is a flowchart showing an example of a step of determining the driving setting of the vehicle in an autonomous driving system according to an exemplary embodiment of the invention.

FIG. 19 is a flowchart showing an example of a step of preventing the driving of the vehicle in an autonomous driving system according to an exemplary embodiment of the invention.

FIG. 20 is a flowchart showing an example of a process of driving to the destination determined according to whether the decryption succeeds or fails in an autonomous system according to an exemplary embodiment of the invention.

FIGS. 21A to 21C are drawings for describing the request of encrypted data blocks and transmission procedure between the vehicle and the infra apparatus in an autonomous driving system according to an exemplary embodiment of the invention.

FIG. 22 is a flowchart showing an example of a step of updating the driving setting in an autonomous driving system according to an exemplary embodiment of the invention.

FIG. 23 shows an example of a user interface indicating the updated driving setting in an autonomous driving system according to an exemplary embodiment of the invention.

FIG. 24 is a flowchart showing an example of performing the vehicle egress procedure in an autonomous driving system according to an exemplary embodiment of the invention.

FIG. 25 shows another example of an autonomous driving system according to an exemplary embodiment of the invention.

FIG. 26 is another example of a flowchart for the user authentication in an autonomous driving system according to an exemplary embodiment of the invention.

Attached drawings, which are included as a part of the detailed description to facilitate understanding of the invention, provide examples of embodiments for the invention, and describe technical features of the invention together with the detailed description.

DESCRIPTION OF EXEMPLARY EMBODIMENTS

Hereinafter, embodiments of the disclosure will be described in detail with reference to the attached drawings. The same or similar components are given the same reference numbers and redundant description thereof is omitted. The suffixes "module" and "unit" of elements herein are used for convenience of description and thus can be used interchangeably and do not have any distinguishable meanings or functions. Further, in the following description, if a detailed description of known techniques associated with the present invention would unnecessarily obscure the gist of the present invention, detailed description thereof will be omitted. In addition, the attached drawings are provided for easy understanding of embodiments of the disclosure and do not limit technical spirits of the disclosure, and the embodiments should be construed as including all modifications, equivalents, and alternatives falling within the spirit and scope of the embodiments.

While terms, such as "first", "second", etc., may be used to describe various components, such components must not be limited by the above terms. The above terms are used only to distinguish one component from another.

When an element is "coupled" or "connected" to another element, it should be understood that a third element may be present between the two elements although the element may be directly coupled or connected to the other element. When an element is "directly coupled" or "directly connected" to another element, it should be understood that no element is present between the two elements.

The singular forms are intended to include the plural forms as well, unless the context clearly indicates otherwise.

In addition, in the specification, it will be further understood that the terms "comprise" and "include" specify the presence of stated features, integers, steps, operations, elements, components, and/or combinations thereof, but do not preclude the presence or addition of one or more other features, integers, steps, operations, elements, components, and/or combinations.

A. Example of Block Diagram of UE and 5G Network

FIG. 1 is a block diagram of a wireless communication system to which methods proposed in the disclosure are applicable.

Referring to FIG. 1, a device (autonomous device) including an autonomous module is defined as a first communication device (910 of FIG. 1), and a processor 911 can perform detailed autonomous operations.

A 5G network including another vehicle communicating with the autonomous device is defined as a second communication device (920 of FIG. 1), and a processor 921 can perform detailed autonomous operations.

The 5G network may be represented as the first communication device and the autonomous device may be represented as the second communication device.

For example, the first communication device or the second communication device may be a base station, a network node, a transmission terminal, a reception terminal, a wireless device, a wireless communication device, an autonomous device, or the like.

For example, a terminal or user equipment (UE) may include a vehicle, a cellular phone, a smart phone, a laptop computer, a digital broadcast terminal, personal digital assistants (PDAs), a portable multimedia player (PMP), a navigation device, a slate PC, a tablet PC, an ultrabook, a wearable device (e.g., a smartwatch, a smart glass and a head mounted display (HMD)), etc. For example, the HMD may be a display device worn on the head of a user. For example, the HMD may be used to realize VR, AR or MR. Referring to FIG. 1, the first communication device 910 and the second communication device 920 include processors 911 and 921, memories 914 and 924, one or more Tx/Rx radio frequency (RF) modules 915 and 925, Tx processors 912 and 922, Rx processors 913 and 923, and antennas 916 and 926. The Tx/Rx module is also referred to as a transceiver. Each Tx/Rx module 915 transmits a signal through each antenna 926. The processor implements the aforementioned functions, processes and/or methods. The processor 921 may be related to the memory 924 that stores program code and data. The memory may be referred to as a computer-readable medium. More specifically, the Tx processor 912 implements various signal processing functions with respect to L1 (i.e., physical layer) in DL (communication from the first communication device to the second communication device). The Rx processor implements various signal processing functions of L1 (i.e., physical layer).

UL (communication from the second communication device to the first communication device) is processed in the first communication device 910 in a way similar to that described in association with a receiver function in the second communication device 920. Each Tx/Rx module 925 receives a signal through each antenna 926. Each Tx/Rx module provides RF carriers and information to the Rx processor 923. The processor 921 may be related to the memory 924 that stores program code and data. The memory may be referred to as a computer-readable medium.

B. Signal Transmission/Reception Method in Wireless Communication System

FIG. 2 is a diagram showing an example of a signal transmission/reception method in a wireless communication system.

Referring to FIG. 2, when a UE is powered on or enters a new cell, the UE performs an initial cell search operation such as synchronization with a BS (S201). For this operation, the UE can receive a primary synchronization channel (P-SCH) and a secondary synchronization channel (S-SCH) from the BS to synchronize with the BS and acquire information such as a cell ID. In LTE and NR systems, the P-SCH and S-SCH are respectively called a primary synchronization signal (PSS) and a secondary synchronization signal (SSS). After initial cell search, the UE can acquire broadcast information in the cell by receiving a physical broadcast channel (PBCH) from the BS. Further, the UE can receive a downlink reference signal (DL RS) in the initial cell search step to check a downlink channel state. After initial cell search, the UE can acquire more detailed system information by receiving a physical downlink shared channel (PDSCH) according to a physical downlink control channel (PDCCH) and information included in the PDCCH (S202).

Meanwhile, when the UE initially accesses the BS or has no radio resource for signal transmission, the UE can perform a random access procedure (RACH) for the BS (steps S203 to S206). To this end, the UE can transmit a specific sequence as a preamble through a physical random access channel (PRACH) (S203 and S205) and receive a random access response (RAR) message for the preamble through a PDCCH and a corresponding PDSCH (S204 and S206). In the case of a contention-based RACH, a contention resolution procedure may be additionally performed.

After the UE performs the above-described process, the UE can perform PDCCH/PDSCH reception (S207) and physical uplink shared channel (PUSCH)/physical uplink control channel (PUCCH) transmission (S208) as normal uplink/downlink signal transmission processes. Particularly, the UE receives downlink control information (DCI) through the PDCCH. The UE monitors a set of PDCCH candidates in monitoring occasions set for one or more control element sets (CORESET) on a serving cell according to corresponding search space configurations. A set of PDCCH candidates to be monitored by the UE is defined in terms of search space sets, and a search space set may be a common search space set or a UE-specific search space set. CORESET includes a set of (physical) resource blocks having a duration of one to three OFDM symbols. A network can configure the UE such that the UE has a plurality of CORESETs. The UE monitors PDCCH candidates in one or more search space sets. Here, monitoring means attempting decoding of PDCCH candidate(s) in a search space. When the UE has successfully decoded one of PDCCH candidates in a search space, the UE determines that a PDCCH has been detected from the PDCCH candidate and performs PDSCH reception or PUSCH transmission on the basis of DCI in the detected PDCCH. The PDCCH can be used to schedule DL transmissions over a PDSCH and UL transmissions over a PUSCH. Here, the DCI in the PDCCH includes downlink assignment (i.e., downlink grant (DL grant)) related to a physical downlink shared channel and including at least a modulation and coding format and resource allocation information, or an uplink grant (UL grant) related to a physical uplink shared channel and including a modulation and coding format and resource allocation information.

An initial access (IA) procedure in a 5G communication system will be additionally described with reference to FIG. 2.

The UE can perform cell search, system information acquisition, beam alignment for initial access, and DL measurement on the basis of an SSB. The SSB is interchangeably used with a synchronization signal/physical broadcast channel (SS/PBCH) block.

The SSB includes a PSS, an SSS and a PBCH. The SSB is configured in four consecutive OFDM symbols, and a PSS, a PBCH, an SSS/PBCH or a PBCH is transmitted for each OFDM symbol. Each of the PSS and the SSS includes one OFDM symbol and 127 subcarriers, and the PBCH includes 3 OFDM symbols and 576 subcarriers.

Cell search refers to a process in which a UE acquires time/frequency synchronization of a cell and detects a cell identifier (ID) (e.g., physical layer cell ID (PCI)) of the cell. The PSS is used to detect a cell ID in a cell ID group and the SSS is used to detect a cell ID group. The PBCH is used to detect an SSB (time) index and a half-frame.

There are 336 cell ID groups and there are 3 cell IDs per cell ID group. A total of 1008 cell IDs are present. Information on a cell ID group to which a cell ID of a cell belongs is provided/acquired through an SSS of the cell, and information on the cell ID among 336 cell ID groups is provided/acquired through a PSS.

The SSB is periodically transmitted in accordance with SSB periodicity. A default SSB periodicity assumed by a UE during initial cell search is defined as 20 ms. After cell access, the SSB periodicity can be set to one of {5 ms, 10 ms, 20 ms, 40 ms, 80 ms, 160 ms} by a network (e.g., a BS).

Next, acquisition of system information (SI) will be described.

SI is divided into a master information block (MIB) and a plurality of system information blocks (SIBs). SI other than the MIB may be referred to as remaining minimum system information. The MIB includes information/parameter for monitoring a PDCCH that schedules a PDSCH carrying SIB1 (SystemInformationBlock1) and is transmitted by a BS through a PBCH of an SSB. SIB1 includes information related to availability and scheduling (e.g., transmission periodicity and SI-window size) of the remaining SIBs (hereinafter, SIBx, x is an integer equal to or greater than 2). SiBx is included in an SI message and transmitted over a PDSCH. Each SI message is transmitted within a periodically generated time window (i.e., SI-window).

A random access (RA) procedure in a 5G communication system will be additionally described with reference to FIG. 2.

A random access procedure is used for various purposes. For example, the random access procedure can be used for network initial access, handover, and UE-triggered UL data transmission. A UE can acquire UL synchronization and UL transmission resources through the random access procedure. The random access procedure is classified into a contention-based random access procedure and a contention-free random access procedure. A detailed procedure for the contention-based random access procedure is as follows.

A UE can transmit a random access preamble through a PRACH as Msg1 of a random access procedure in UL. Random access preamble sequences having different two lengths are supported. A long sequence length 839 is applied to subcarrier spacings of 1.25 kHz and 5 kHz and a short sequence length 139 is applied to subcarrier spacings of 15 kHz, 30 kHz, 60 kHz and 120 kHz.

When a BS receives the random access preamble from the UE, the BS transmits a random access response (RAR) message (Msg2) to the UE. A PDCCH that schedules a PDSCH carrying a RAR is CRC masked by a random access (RA) radio network temporary identifier (RNTI) (RA-RNTI) and transmitted. Upon detection of the PDCCH masked by the RA-RNTI, the UE can receive a RAR from the PDSCH scheduled by DCI carried by the PDCCH. The UE checks whether the RAR includes random access response information with respect to the preamble transmitted by the UE, that is, Msg1. Presence or absence of random access information with respect to Msg1 transmitted by the UE can be determined according to presence or absence of a random access preamble ID with respect to the preamble transmitted by the UE. If there is no response to Msg1, the UE can retransmit the RACH preamble less than a predetermined number of times while performing power ramping. The UE calculates PRACH transmission power for preamble retransmission on the basis of most recent pathloss and a power ramping counter.

The UE can perform UL transmission through Msg3 of the random access procedure over a physical uplink shared channel on the basis of the random access response information. Msg3 can include an RRC connection request and a UE ID. The network can transmit Msg4 as a response to Msg3, and Msg4 can be handled as a contention resolution message on DL. The UE can enter an RRC connected state by receiving Msg4.

C. Beam Management (BM) Procedure of 5G Communication System

A BM procedure can be divided into (1) a DL MB procedure using an SSB or a CSI-RS and (2) a UL BM procedure using a sounding reference signal (SRS). In addition, each BM procedure can include Tx beam swiping for determining a Tx beam and Rx beam swiping for determining an Rx beam.

The DL BM procedure using an SSB will be described.

Configuration of a beam report using an SSB is performed when channel state information (CSI)/beam is configured in RRC_CONNECTED.

- A UE receives a CSI-ResourceConfig IE including CSI-SSB-ResourceSetList for SSB resources used for BM from a BS. The RRC parameter "csi-SSB-Resource-SetList" represents a list of SSB resources used for beam management and report in one resource set. Here, an SSB resource set can be set as {SSBx1, SSBx2, SSBx3, SSBx4, . . . }. An SSB index can be defined in the range of 0 to 63.
- The UE receives the signals on SSB resources from the BS on the basis of the CSI-S SB-ResourceSetList.
- When CSI-RS reportConfig with respect to a report on SSBRI and reference signal received power (RSRP) is set, the UE reports the best SSBRI and RSRP corresponding thereto to the BS. For example, when reportQuantity of the CSI-RS reportConfig IE is set to 'ssb-Index-RSRP', the UE reports the best SSBRI and RSRP corresponding thereto to the BS.

When a CSI-RS resource is configured in the same OFDM symbols as an SSB and 'QCL-TypeD' is applicable, the UE can assume that the CSI-RS and the SSB are quasi co-located (QCL) from the viewpoint of 'QCL-TypeD'. Here, QCL-TypeD may mean that antenna ports are quasi co-located from the viewpoint of a spatial Rx parameter.

When the UE receives signals of a plurality of DL antenna ports in a QCL-TypeD relationship, the same Rx beam can be applied.

Next, a DL BM procedure using a CSI-RS will be described.

An Rx beam determination (or refinement) procedure of a UE and a Tx beam swiping procedure of a BS using a CSI-RS will be sequentially described. A repetition parameter is set to 'ON' in the Rx beam determination procedure of a UE and set to 'OFF' in the Tx beam swiping procedure of a BS.

First, the Rx beam determination procedure of a UE will be described.

- The UE receives an NZP CSI-RS resource set IE including an RRC parameter with respect to 'repetition' from a BS through RRC signaling. Here, the RRC parameter 'repetition' is set to 'ON'.
- The UE repeatedly receives signals on resources in a CSI-RS resource set in which the RRC parameter 'repetition' is set to 'ON' in different OFDM symbols through the same Tx beam (or DL spatial domain transmission filters) of the BS.
- The UE determines an RX beam thereof.
- The UE skips a CSI report. That is, the UE can skip a CSI report when the RRC parameter 'repetition' is set to 'ON'.

Next, the Tx beam determination procedure of a BS will be described.

- A UE receives an NZP CSI-RS resource set IE including an RRC parameter with respect to 'repetition' from the BS through RRC signaling. Here, the RRC parameter 'repetition' is related to the Tx beam swiping procedure of the BS when set to 'OFF'.
- The UE receives signals on resources in a CSI-RS resource set in which the RRC parameter 'repetition' is set to 'OFF' in different DL spatial domain transmission filters of the BS.
- The UE selects (or determines) a best beam.
- The UE reports an ID (e.g., CRI) of the selected beam and related quality information (e.g., RSRP) to the BS. That is, when a CSI-RS is transmitted for BM, the UE reports a CRI and RSRP with respect thereto to the BS.

Next, the UL BM procedure using an SRS will be described.

- A UE receives RRC signaling (e.g., SRS-Config IE) including a (RRC parameter) purpose parameter set to 'beam management" from a BS. The SRS-Config IE is used to set SRS transmission. The SRS-Config IE includes a list of SRS-Resources and a list of SRS-ResourceSets. Each SRS resource set refers to a set of SRS-resources.
- The UE determines Tx beamforming for SRS resources to be transmitted on the basis of SRS-SpatialRelation Info included in the SRS-Config IE. Here, SRS-SpatialRelation Info is set for each SRS resource and indicates whether the same beamforming as that used for an SSB, a CSI-RS or an SRS will be applied for each SRS resource.
  - When SRS-SpatialRelationInfo is set for SRS resources, the same beamforming as that used for the SSB, CSI-RS or SRS is applied. However, when SRS-SpatialRelationInfo is not set for SRS resources, the UE arbitrarily determines Tx beamforming and transmits an SRS through the determined Tx beamforming.

Next, a beam failure recovery (BFR) procedure will be described.

In a beamformed system, radio link failure (RLF) may frequently occur due to rotation, movement or beamforming blockage of a UE. Accordingly, NR supports BFR in order to prevent frequent occurrence of RLF. BFR is similar to a radio link failure recovery procedure and can be supported when a UE knows new candidate beams. For beam failure detection, a BS configures beam failure detection reference signals for a UE, and the UE declares beam failure when the number of beam failure indications from the physical layer of the UE reaches a threshold set through RRC signaling within a period set through RRC signaling of the BS. After beam failure detection, the UE triggers beam failure recovery by initiating a random access procedure in a PCell and performs beam failure recovery by selecting a suitable beam. (When the BS provides dedicated random access resources for certain beams, these are prioritized by the UE). Completion of the aforementioned random access procedure is regarded as completion of beam failure recovery.

D. URLLC (Ultra-Reliable and Low Latency Communication)

URLLC transmission defined in NR can refer to (1) a relatively low traffic size, (2) a relatively low arrival rate, (3) extremely low latency requirements (e.g., 0.5 and 1 ms), (4) relatively short transmission duration (e.g., 2 OFDM symbols), (5) urgent services/messages, etc. In the case of UL, transmission of traffic of a specific type (e.g., URLLC) needs to be multiplexed with another transmission (e.g., eMBB) scheduled in advance in order to satisfy more stringent latency requirements. In this regard, a method of providing information indicating preemption of specific resources to a UE scheduled in advance and allowing a URLLC UE to use the resources for UL transmission is provided.

NR supports dynamic resource sharing between eMBB and URLLC. eMBB and URLLC services can be scheduled on non-overlapping time/frequency resources, and URLLC transmission can occur in resources scheduled for ongoing eMBB traffic. An eMBB UE may not ascertain whether PDSCH transmission of the corresponding UE has been partially punctured and the UE may not decode a PDSCH due to corrupted coded bits. In view of this, NR provides a preemption indication. The preemption indication may also be referred to as an interrupted transmission indication.

With regard to the preemption indication, a UE receives DownlinkPreemption IE through RRC signaling from a BS. When the UE is provided with DownlinkPreemption IE, the UE is configured with INT-RNTI provided by a parameter int-RNTI in DownlinkPreemption IE for monitoring of a PDCCH that conveys DCI format 2_1. The UE is additionally configured with a corresponding set of positions for fields in DCI format 2_1 according to a set of serving cells and positionInDCI by INT-ConfigurationPerServing Cell including a set of serving cell indexes provided by serving-CellID, configured having an information payload size for DCI format 2_1 according to dci-Payloadsize, and configured with indication granularity of time-frequency resources according to timeFrequencySect.

The UE receives DCI format 2_1 from the BS on the basis of the DownlinkPreemption IE.

When the UE detects DCI format 2_1 for a serving cell in a configured set of serving cells, the UE can assume that there is no transmission to the UE in PRBs and symbols indicated by the DCI format 2_1 in a set of PRBs and a set of symbols in a last monitoring period before a monitoring period to which the DCI format 2_1 belongs. For example, the UE assumes that a signal in a time-frequency resource indicated according to preemption is not DL transmission scheduled therefor and decodes data on the basis of signals received in the remaining resource region.

E. mMTC (Massive MTC)

mMTC (massive Machine Type Communication) is one of 5G scenarios for supporting a hyper-connection service providing simultaneous communication with a large number of UEs. In this environment, a UE intermittently performs communication with a very low speed and mobility. Accordingly, a main goal of mMTC is operating a UE for a long time at a low cost. With respect to mMTC, 3GPP deals with MTC and NB (NarrowBand)-IoT.

mMTC has features such as repetitive transmission of a PDCCH, a PUCCH, a PDSCH (physical downlink shared channel), a PUSCH, etc., frequency hopping, retuning, and a guard period.

That is, a PUSCH (or a PUCCH (particularly, a long PUCCH) or a PRACH) including specific information and a PDSCH (or a PDCCH) including a response to the specific information are repeatedly transmitted. Repetitive transmission is performed through frequency hopping, and for repetitive transmission, (RF) retuning from a first frequency resource to a second frequency resource is performed in a guard period and the specific information and the response to the specific information can be transmitted/received through a narrowband (e.g., 6 resource blocks (RBs) or 1 RB).

F. Basic Operation Between Autonomous Vehicles Using 5G Communication

FIG. 3 shows an example of basic operations of an autonomous vehicle and a 5G network in a 5G communication system.

The autonomous vehicle transmits specific information to the 5G network (S1). The specific information may include autonomous driving related information. In addition, the 5G network can determine whether to remotely control the vehicle (S2). Here, the 5G network may include a server or a module which performs remote control related to autonomous driving. In addition, the 5G network can transmit information (or signal) related to remote control to the autonomous vehicle (S3).

G. Applied Operations Between Autonomous Vehicle and 5G Network in 5G Communication System Hereinafter, the operation of an autonomous vehicle using 5G communication will be described in more detail with reference to wireless communication technology (BM procedure, URLLC, mMTC, etc.) described in FIGS. 1 and 2.

First, a basic procedure of an applied operation to which a method proposed by the present invention which will be described later and eMBB of 5G communication are applied will be described.

As in steps S1 and S3 of FIG. 3, the autonomous vehicle performs an initial access procedure and a random access procedure with the 5G network prior to step S1 of FIG. 3 in order to transmit/receive signals, information and the like to/from the 5G network.

More specifically, the autonomous vehicle performs an initial access procedure with the 5G network on the basis of an SSB in order to acquire DL synchronization and system information. A beam management (BM) procedure and a beam failure recovery procedure may be added in the initial access procedure, and quasi-co-location (QCL) relation may be added in a process in which the autonomous vehicle receives a signal from the 5G network.

In addition, the autonomous vehicle performs a random access procedure with the 5G network for UL synchronization acquisition and/or UL transmission. The 5G network can transmit, to the autonomous vehicle, a UL grant for scheduling transmission of specific information. Accordingly, the autonomous vehicle transmits the specific information to the 5G network on the basis of the UL grant. In addition, the 5G network transmits, to the autonomous vehicle, a DL grant for scheduling transmission of 5G processing results with respect to the specific information. Accordingly, the 5G network can transmit, to the autonomous vehicle, information (or a signal) related to remote control on the basis of the DL grant.

Next, a basic procedure of an applied operation to which a method proposed by the present invention which will be described later and URLLC of 5G communication are applied will be described.

As described above, an autonomous vehicle can receive DownlinkPreemption IE from the 5G network after the autonomous vehicle performs an initial access procedure and/or a random access procedure with the 5G network. Then, the autonomous vehicle receives DCI format 2_1 including a preemption indication from the 5G network on the basis of DownlinkPreemption IE. The autonomous vehicle does not perform (or expect or assume) reception of eMBB data in resources (PRBs and/or OFDM symbols) indicated by the preemption indication. Thereafter, when the autonomous vehicle needs to transmit specific information, the autonomous vehicle can receive a UL grant from the 5G network.

Next, a basic procedure of an applied operation to which a method proposed by the present invention which will be described later and mMTC of 5G communication are applied will be described.

Description will focus on parts in the steps of FIG. 3 which are changed according to application of mMTC.

In step S1 of FIG. 3, the autonomous vehicle receives a UL grant from the 5G network in order to transmit specific information to the 5G network. Here, the UL grant may include information on the number of repetitions of transmission of the specific information and the specific information may be repeatedly transmitted on the basis of the information on the number of repetitions. That is, the autonomous vehicle transmits the specific information to the 5G network on the basis of the UL grant. Repetitive transmission of the specific information may be performed through frequency hopping, the first transmission of the specific information may be performed in a first frequency resource, and the second transmission of the specific information may be performed in a second frequency resource. The specific information can be transmitted through a narrowband of 6 resource blocks (RBs) or 1 RB.

H. Autonomous Driving Operation Between Vehicles Using 5G Communication

FIG. 4 shows an example of a basic operation between vehicles using 5G communication.

A first vehicle transmits specific information to a second vehicle (S61). The second vehicle transmits a response to the specific information to the first vehicle (S62).

Meanwhile, a configuration of an applied operation between vehicles may depend on whether the 5G network is directly (sidelink communication transmission mode 3) or indirectly (sidelink communication transmission mode 4) involved in resource allocation for the specific information and the response to the specific information.

Next, an applied operation between vehicles using 5G communication will be described.

First, a method in which a 5G network is directly involved in resource allocation for signal transmission/reception between vehicles will be described.

The 5G network can transmit DCI format 5A to the first vehicle for scheduling of mode-3 transmission (PSCCH and/or PSSCH transmission). Here, a physical sidelink control channel (PSCCH) is a 5G physical channel for scheduling of transmission of specific information a physical sidelink shared channel (PSSCH) is a 5G physical channel for transmission of specific information. In addition, the first vehicle transmits SCI format 1 for scheduling of specific information transmission to the second vehicle over a PSCCH. Then, the first vehicle transmits the specific information to the second vehicle over a PSSCH.

Next, a method in which a 5G network is indirectly involved in resource allocation for signal transmission/reception will be described.

The first vehicle senses resources for mode-4 transmission in a first window. Then, the first vehicle selects resources for mode-4 transmission in a second window on the basis of the sensing result. Here, the first window refers to a sensing window and the second window refers to a selection window. The first vehicle transmits SCI format 1 for scheduling of transmission of specific information to the second vehicle over a PSCCH on the basis of the selected resources. Then, the first vehicle transmits the specific information to the second vehicle over a PSSCH.

The above-described 5G communication technology can be combined with methods proposed in the present invention which will be described later and applied or can complement the methods proposed in the present invention to make technical features of the methods concrete and clear.

Driving (1) Exterior of Vehicle

FIG. 5 is a diagram showing a vehicle according to an embodiment of the present invention.

Referring to FIG. 5, a vehicle 10 according to an embodiment of the present invention is defined as a transportation means traveling on roads or railroads. The vehicle 10 includes a car, a train and a motorcycle. The vehicle 10 may include an internal-combustion engine vehicle having an engine as a power source, a hybrid vehicle having an engine and a motor as a power source, and an electric vehicle having an electric motor as a power source. The vehicle 10 may be a private own vehicle. The vehicle 10 may be a shared vehicle. The vehicle 10 may be an autonomous vehicle.

(2) Components of Vehicle

FIG. 6 is a control block diagram of the vehicle according to an embodiment of the present invention.

Referring to FIG. 6, the vehicle 10 may include a user interface device 200, an object detection device 210, a communication device 220, a driving operation device 230, a main ECU 240, a driving control device 250, an autonomous device 260, a sensing unit 270, and a position data generation device 280. The object detection device 210, the communication device 220, the driving operation device 230, the main ECU 240, the driving control device 250, the autonomous device 260, the sensing unit 270 and the position data generation device 280 may be realized by electronic devices which generate electric signals and exchange the electric signals from one another.

1) User Interface Device

The user interface device 200 is a device for communication between the vehicle 10 and a user. The user interface device 200 can receive user input and provide information generated in the vehicle 10 to the user. The vehicle 10 can realize a user interface (UI) or user experience (UX) through the user interface device 200. The user interface device 200 may include an input device, an output device and a user monitoring device.

2) Object Detection Device

The object detection device 210 can generate information about objects outside the vehicle 10. Information about an object can include at least one of information on presence or absence of the object, positional information of the object, information on a distance between the vehicle 10 and the object, and information on a relative speed of the vehicle 10 with respect to the object. The object detection device 210 can detect objects outside the vehicle 10. The object detection device 210 may include at least one sensor which can detect objects outside the vehicle 10. The object detection device 210 may include at least one of a camera, a radar, a lidar, an ultrasonic sensor and an infrared sensor. The object detection device 210 can provide data about an object generated on the basis of a sensing signal generated from a sensor to at least one electronic device included in the vehicle.

2.1) Camera

The camera can generate information about objects outside the vehicle 10 using images. The camera may include at least one lens, at least one image sensor, and at least one processor which is electrically connected to the image sensor, processes received signals and generates data about objects on the basis of the processed signals.

The camera may be at least one of a mono camera, a stereo camera and an around view monitoring (AVM) camera. The camera can acquire positional information of objects, information on distances to objects, or information on relative speeds with respect to objects using various image processing algorithms. For example, the camera can acquire information on a distance to an object and information on a relative speed with respect to the object from an acquired image on the basis of change in the size of the object over time. For example, the camera may acquire information on a distance to an object and information on a relative speed with respect to the object through a pin-hole model, road profiling, or the like. For example, the camera may acquire information on a distance to an object and information on a relative speed with respect to the object from a stereo image acquired from a stereo camera on the basis of disparity information.

The camera may be attached at a portion of the vehicle at which FOV (field of view) can be secured in order to photograph the outside of the vehicle. The camera may be disposed in proximity to the front windshield inside the vehicle in order to acquire front view images of the vehicle. The camera may be disposed near a front bumper or a radiator grill. The camera may be disposed in proximity to a rear glass inside the vehicle in order to acquire rear view images of the vehicle. The camera may be disposed near a rear bumper, a trunk or a tail gate. The camera may be disposed in proximity to at least one of side windows inside the vehicle in order to acquire side view images of the vehicle. Alternatively, the camera may be disposed near a side mirror, a fender or a door.

2.2) Radar

The radar can generate information about an object outside the vehicle using electromagnetic waves. The radar may include an electromagnetic wave transmitter, an electromagnetic wave receiver, and at least one processor which is electrically connected to the electromagnetic wave transmitter and the electromagnetic wave receiver, processes received signals and generates data about an object on the basis of the processed signals. The radar may be realized as a pulse radar or a continuous wave radar in terms of electromagnetic wave emission. The continuous wave radar may be realized as a frequency modulated continuous wave (FMCW) radar or a frequency shift keying (FSK) radar according to signal waveform. The radar can detect an object through electromagnetic waves on the basis of TOF (Time of Flight) or phase shift and detect the position of the detected object, a distance to the detected object and a relative speed with respect to the detected object. The radar may be disposed at an appropriate position outside the vehicle in order to detect objects positioned in front of, behind or on the side of the vehicle.

2.3) Lidar

The lidar can generate information about an object outside the vehicle 10 using a laser beam. The lidar may include a light transmitter, a light receiver, and at least one processor which is electrically connected to the light transmitter and the light receiver, processes received signals and generates data about an object on the basis of the processed signal. The lidar may be realized according to TOF or phase shift. The lidar may be realized as a driven type or a non-driven type. A driven type lidar may be rotated by a motor and detect an object around the vehicle 10. A non-driven type lidar may detect an object positioned within a predetermined range from the vehicle according to light steering. The vehicle 10 may include a plurality of non-drive type lidars. The lidar can detect an object through a laser beam on the basis of TOF (Time of Flight) or phase shift and detect the position of the detected object, a distance to the detected object and a relative speed with respect to the detected object. The lidar may be disposed at an appropriate position outside the vehicle in order to detect objects positioned in front of, behind or on the side of the vehicle.

3) Communication Device

The communication device 220 can exchange signals with devices disposed outside the vehicle 10. The communication device 220 can exchange signals with at least one of infrastructure (e.g., a server and a broadcast station), another vehicle and a terminal. The communication device 220 may include a transmission antenna, a reception antenna, and at least one of a radio frequency (RF) circuit and an RF element which can implement various communication protocols in order to perform communication.

For example, the communication device can exchange signals with external devices on the basis of C-V2X (Cellular V2X). For example, C-V2X can include sidelink communication based on LTE and/or sidelink communication based on NR. Details related to C-V2X will be described later.

For example, the communication device can exchange signals with external devices on the basis of DSRC (Dedicated Short Range Communications) or WAVE (Wireless Access in Vehicular Environment) standards based on IEEE 802.11p PHY/MAC layer technology and IEEE 1609 Network/Transport layer technology. DSRC (or WAVE standards) is communication specifications for providing an intelligent transport system (ITS) service through short-range dedicated communication between vehicle-mounted devices or between a roadside device and a vehicle-mounted device. DSRC may be a communication scheme that can use a frequency of 5.9 GHz and have a data transfer rate in the range of 3 Mbps to 27 Mbps. IEEE 802.11p may be combined with IEEE 1609 to support DSRC (or WAVE standards).

The communication device of the present invention can exchange signals with external devices using only one of C-V2X and DSRC. Alternatively, the communication device of the present invention can exchange signals with external devices using a hybrid of C-V2X and DSRC.

4) Driving Operation Device

The driving operation device 230 is a device for receiving user input for driving. In a manual mode, the vehicle 10 may be driven on the basis of a signal provided by the driving operation device 230. The driving operation device 230 may include a steering input device (e.g., a steering wheel), an acceleration input device (e.g., an acceleration pedal) and a brake input device (e.g., a brake pedal).

5) Main ECU

The main ECU 240 can control the overall operation of at least one electronic device included in the vehicle 10.

6) Driving Control Device

The driving control device 250 is a device for electrically controlling various vehicle driving devices included in the vehicle 10. The driving control device 250 may include a power train driving control device, a chassis driving control device, a door/window driving control device, a safety device driving control device, a lamp driving control device, and an air-conditioner driving control device. The power train driving control device may include a power source driving control device and a transmission driving control device. The chassis driving control device may include a steering driving control device, a brake driving control device and a suspension driving control device. Meanwhile, the safety device driving control device may include a seat belt driving control device for seat belt control.

The driving control device 250 includes at least one electronic control device (e.g., a control ECU (Electronic Control Unit)).

The driving control device 250 can control vehicle driving devices on the basis of signals received by the autonomous device 260. For example, the driving control device 250 can control a power train, a steering device and a brake device on the basis of signals received by the autonomous device 260.

7) Autonomous Device

The autonomous device 260 can generate a route for self-driving on the basis of acquired data. The autonomous device 260 can generate a driving plan for traveling along the generated route. The autonomous device 260 can generate a signal for controlling movement of the vehicle according to the driving plan. The autonomous device 260 can provide the signal to the driving control device 250.

The autonomous device 260 can implement at least one ADAS (Advanced Driver Assistance System) function. The ADAS can implement at least one of ACC (Adaptive Cruise Control), AEB (Autonomous Emergency Braking), FCW (Forward Collision Warning), LKA (Lane Keeping Assist), LCA (Lane Change Assist), TFA (Target Following Assist), BSD (Blind Spot Detection), HBA (High Beam Assist), APS (Auto Parking System), a PD collision warning system, TSR (Traffic Sign Recognition), TSA (Traffic Sign Assist), NV (Night Vision), DSM (Driver Status Monitoring) and TJA (Traffic Jam Assist).

The autonomous device 260 can perform switching from a self-driving mode to a manual driving mode or switching from the manual driving mode to the self-driving mode. For example, the autonomous device 260 can switch the mode of the vehicle 10 from the self-driving mode to the manual driving mode or from the manual driving mode to the self-driving mode on the basis of a signal received from the user interface device 200.

8) Sensing Unit

The sensing unit 270 can detect a state of the vehicle. The sensing unit 270 may include at least one of an internal measurement unit (IMU) sensor, a collision sensor, a wheel sensor, a speed sensor, an inclination sensor, a weight sensor, a heading sensor, a position module, a vehicle forward/ backward movement sensor, a battery sensor, a fuel sensor, a tire sensor, a steering sensor, a temperature sensor, a humidity sensor, an ultrasonic sensor, an illumination sensor, and a pedal position sensor. Further, the IMU sensor may include one or more of an acceleration sensor, a gyro sensor and a magnetic sensor.

The sensing unit 270 can generate vehicle state data on the basis of a signal generated from at least one sensor. Vehicle state data may be information generated on the basis of data detected by various sensors included in the vehicle. The sensing unit 270 may generate vehicle attitude data, vehicle motion data, vehicle yaw data, vehicle roll data, vehicle pitch data, vehicle collision data, vehicle orientation data, vehicle angle data, vehicle speed data, vehicle acceleration data, vehicle tilt data, vehicle forward/backward movement data, vehicle weight data, battery data, fuel data, tire pressure data, vehicle internal temperature data, vehicle internal humidity data, steering wheel rotation angle data, vehicle external illumination data, data of a pressure applied to an acceleration pedal, data of a pressure applied to a brake panel, etc.

9) Position Data Generation Device

The position data generation device 280 can generate position data of the vehicle 10. The position data generation device 280 may include at least one of a global positioning system (GPS) and a differential global positioning system (DGPS). The position data generation device 280 can generate position data of the vehicle 10 on the basis of a signal generated from at least one of the GPS and the DGPS. According to an embodiment, the position data generation device 280 can correct position data on the basis of at least one of the inertial measurement unit (IMU) sensor of the sensing unit 270 and the camera of the object detection device 210. The position data generation device 280 may also be called a global navigation satellite system (GNSS).

The vehicle 10 may include an internal communication system 50. The plurality of electronic devices included in the vehicle 10 can exchange signals through the internal communication system 50. The signals may include data. The internal communication system 50 can use at least one communication protocol (e.g., CAN, LIN, FlexRay, MOST or Ethernet).

(3) Components of Autonomous Device

FIG. 7 is a control block diagram of the autonomous device according to an embodiment of the present invention.

Referring to FIG. 7, the autonomous device 260 may include a memory 140, a processor 170, an interface 180 and a power supply 190.

The memory 140 is electrically connected to the processor 170. The memory 140 can store basic data with respect to units, control data for operation control of units, and input/output data. The memory 140 can store data processed in the processor 170. Hardware-wise, the memory 140 can be configured as at least one of a ROM, a RAM, an EPROM, a flash drive and a hard drive. The memory 140 can store various types of data for overall operation of the autonomous device 260, such as a program for processing or control of the processor 170. The memory 140 may be integrated with the processor 170. According to an embodiment, the memory 140 may be categorized as a subcomponent of the processor 170.

The interface 180 can exchange signals with at least one electronic device included in the vehicle 10 in a wired or wireless manner. The interface 180 can exchange signals with at least one of the object detection device 210, the communication device 220, the driving operation device 230, the main ECU 240, the driving control device 250, the sensing unit 270 and the position data generation device 280 in a wired or wireless manner. The interface 180 can be configured using at least one of a communication module, a terminal, a pin, a cable, a port, a circuit, an element and a device.

The power supply 190 can provide power to the autonomous device 260. The power supply 190 can be provided with power from a power source (e.g., a battery) included in the vehicle 10 and supply the power to each unit of the autonomous device 260. The power supply 190 can operate according to a control signal supplied from the main ECU 240. The power supply 190 may include a switched-mode power supply (SMPS).

The processor 170 can be electrically connected to the memory 140, the interface 180 and the power supply 190 and exchange signals with these components. The processor 170 can be realized using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electronic units for executing other functions.

The processor 170 can be operated by power supplied from the power supply 190. The processor 170 can receive data, process the data, generate a signal and provide the signal while power is supplied thereto.

The processor 170 can receive information from other electronic devices included in the vehicle 10 through the interface 180. The processor 170 can provide control signals to other electronic devices in the vehicle 10 through the interface 180.

The autonomous device 260 may include at least one printed circuit board (PCB). The memory 140, the interface 180, the power supply 190 and the processor 170 may be electrically connected to the PCB.

(4) Operation of Autonomous Device

FIG. 8 is a diagram showing a signal flow in an autonomous vehicle according to an embodiment of the present invention.

1) Reception Operation

Referring to FIG. 8, the processor 170 can perform a reception operation. The processor 170 can receive data from at least one of the object detection device 210, the communication device 220, the sensing unit 270 and the position data generation device 280 through the interface 180. The processor 170 can receive object data from the object detection device 210. The processor 170 can receive HD map data from the communication device 220. The processor 170 can receive vehicle state data from the sensing unit 270. The processor 170 can receive position data from the position data generation device 280.

2) Processing/Determination Operation

The processor 170 can perform a processing/determination operation. The processor 170 can perform the processing/determination operation on the basis of traveling situation information. The processor 170 can perform the processing/determination operation on the basis of at least one of object data, HD map data, vehicle state data and position data.

2.1) Driving Plan Data Generation Operation

The processor 170 can generate driving plan data. For example, the processor 170 may generate electronic horizon data. The electronic horizon data can be understood as driving plan data in a range from a position at which the vehicle 10 is located to a horizon. The horizon can be understood as a point a predetermined distance before the position at which the vehicle 10 is located on the basis of a predetermined traveling route. The horizon may refer to a point at which the vehicle can arrive after a predetermined time from the position at which the vehicle 10 is located along a predetermined traveling route.

The electronic horizon data can include horizon map data and horizon path data.

2.1.1) Horizon Map Data

The horizon map data may include at least one of topology data, road data, HD map data and dynamic data. According to an embodiment, the horizon map data may include a plurality of layers. For example, the horizon map data may include a first layer that matches the topology data, a second layer that matches the road data, a third layer that matches the HD map data, and a fourth layer that matches the dynamic data. The horizon map data may further include static object data.

The topology data may be explained as a map created by connecting road centers. The topology data is suitable for approximate display of a location of a vehicle and may have a data form used for navigation for drivers. The topology data may be understood as data about road information other than information on driveways. The topology data may be generated on the basis of data received from an external server through the communication device 220. The topology data may be based on data stored in at least one memory included in the vehicle 10.

The road data may include at least one of road slope data, road curvature data and road speed limit data. The road data may further include no-passing zone data. The road data may be based on data received from an external server through the communication device 220. The road data may be based on data generated in the object detection device 210.

The HD map data may include detailed topology information in units of lanes of roads, connection information of each lane, and feature information for vehicle localization (e.g., traffic signs, lane marking/attribute, road furniture, etc.). The HD map data may be based on data received from an external server through the communication device 220.

The dynamic data may include various types of dynamic information which can be generated on roads. For example, the dynamic data may include construction information, variable speed road information, road condition information, traffic information, moving object information, etc. The dynamic data may be based on data received from an external server through the communication device 220. The dynamic data may be based on data generated in the object detection device 210.

The processor 170 can provide map data in a range from a position at which the vehicle 10 is located to the horizon.

2.1.2) Horizon Path Data

The horizon path data may be explained as a trajectory through which the vehicle 10 can travel in a range from a position at which the vehicle 10 is located to the horizon. The horizon path data may include data indicating a relative probability of selecting a road at a decision point (e.g., a fork, a junction, a crossroad, or the like). The relative probability may be calculated on the basis of a time taken to arrive at a final destination. For example, if a time taken to arrive at a final destination is shorter when a first road is selected at a decision point than that when a second road is selected, a probability of selecting the first road can be calculated to be higher than a probability of selecting the second road.

The horizon path data can include a main path and a sub-path. The main path may be understood as a trajectory obtained by connecting roads having a high relative probability of being selected. The sub-path can be branched from at least one decision point on the main path. The sub-path may be understood as a trajectory obtained by connecting at least one road having a low relative probability of being selected at at least one decision point on the main path.

3) Control Signal Generation Operation

The processor 170 can perform a control signal generation operation. The processor 170 can generate a control signal on the basis of the electronic horizon data. For example, the processor 170 may generate at least one of a power train control signal, a brake device control signal and a steering device control signal on the basis of the electronic horizon data.

The processor 170 can transmit the generated control signal to the driving control device 250 through the interface 180. The driving control device 250 can transmit the control signal to at least one of a power train 251, a brake device 252 and a steering device 254.

Autonomous Vehicle Usage Scenario

FIG. 9 is a diagram referred to describe a usage scenario of the user according to an embodiment of the present invention.

1) Destination Forecast Scenario

A first scenario S111 is a destination forecast scenario of the user. A user terminal may install an application that can be linked with a cabin system 300. The user terminal can forecast the destination of the user through the application based on user's contextual information. The user terminal may provide vacant seat information in a cabin through the application.

2) Cabin Interior Layout Countermeasure Scenario

A second scenario S112 is a cabin interior layout countermeasure scenario. The cabin system 300 may further include a scanning device for acquiring data on the user located outside a vehicle 300. The scanning device scans the user and can obtain physical data and baggage data of the user. The physical data and baggage data of the user can be used to set the layout. The physical data of the user can be used for user authentication. The scanning device can include at least one image sensor. The image sensor can use light in a visible light band or an infrared band to acquire an image of the user.

The seat system 360 can set the layout in the cabin based on at least one of the physical data and baggage data of the user. For example, the seat system 360 may provide a baggage loading space or a seat installation space.

3) User Welcome Scenario

A third scenario S113 is a user welcome scenario. The cabin system 300 may further include at least one guide light. The guide light may be disposed on a floor in the cabin. The cabin system 300 may output the guide light such that the user is seated on the seat, which is already set among the plurality of sheets when user's boarding is detected. For example, a main controller 370 may implement moving light through sequential lighting of a plurality of light sources according to the time from an open door to a predetermined user seat.

4) Seat Adjustment Service Scenario

A fourth scenario S114 is a seat adjustment service scenario. The seat system 360 may adjust at least one element of the seat that matches the user based on the acquired physical information.

5) Personal Content Provision Scenario

A fifth scenario S115 is a personal content provision scenario. A display system 350 can receive personal data of the user via an input device 310 or a communication device 330. The display system 350 can provide a content corresponding to the personal data of the user.

6) Product Provision Scenario

A sixth scenario S116 is a product provision scenario. A cargo system 355 can receive user data through the input device 310 or the communication device 330. The user data may include preference data of the user and destination data of the user. The cargo system 355 may provide a product based on the user data.

7) Payment Scenario

A seventh scenario S117 is a payment scenario. A payment system 365 can receive data for price calculation from at least one of the input device 310, the communication device 330 and the cargo system 355. The payment system 365 can calculate a vehicle usage price of the user based on the received data. The payment system 365 can require the user (that is, mobile terminal of user) to pay a fee at the calculated price.

8) User Display System Control Scenario

An eighth scenario S118 is a user display system control scenario. The input device 310 may receive a user input configured in at least one form and may convert the user input into an electrical signal. The display system 350 can control a content displayed based on the electrical signal.

9) AI Agent Scenario

A ninth scenario S119 is a multi-channel artificial intelligence (AI) agent scenario for multiple users. An AI agent 372 can distinguish the user input of each of multiple users. The AI agent 372 can control at least one of the display system 350, the cargo system 355, the seat system 360, and the payment system 365 based on the electric signal converted from the user input of each of the multiple users.

10) Multimedia Content Provision Scenario for Multiple Users

A tenth scenario S120 is a multimedia content provision scenario for multiple users. The display system 350 can provide a content that all users can view together. In this case, the display system 350 can individually provide the same sound to multiple users through a speaker provided in each sheet. The display system 350 can provide a content that the multiple users individually can view. In this case, the display system 350 can provide an individual sound through the speaker provided in each sheet.

11) User Safety Securing Scenario

An eleventh scenario S121 is a user safety securing scenario. When vehicle peripheral object information that poses a threat to the user is acquired, the main controller 370 can control to output an alarm of the vehicle peripheral object via the display system 350.

12) Belongings Loss Prevention Scenario

A twelfth scenario S122 is a scenario for preventing loss of belongings of the user. The main controller 370 can obtain data on the belongings of the user via the input device 310. The main controller 370 can obtain user motion data through the input device 310. The main controller 370 can determine whether the user places the belongings and gets off based on the data of the belongings and the motion data. The main controller 370 can control to output an alarm of the belongings through the display system 350.

13) Get Off Report Scenario

A thirteenth scenario S123 is a get off report scenario. The main controller 370 can receive get off data of the user through the input device 310. After the user gets off, the main controller 370 can provide report data for the get off to the mobile terminal of the user through the communication device 330. The report data may include the entire usage fee data of the vehicle 10.

Vehicle-To-Everything (V2X)

FIG. 10 is an example of the V2X communication to which the invention can be applied.

The V2X communication includes communication between the vehicle and any entity, such as a vehicle-to-vehicle (V2V) referring to communication between vehicles, a vehicle to infrastructure (V2I) referring to communication between a vehicle and an eNB or a road side unit (RSU), a vehicle-to-pedestrian (V2P) referring to communication between a vehicle and an UE carried by an individual (a walker, a bicycle driver, a vehicle driver or passenger), vehicle-to-network (V2N), and the like.

The V2X communication may indicate the same meaning as V2X sidelink or NR V2X, or may indicate a broader meaning including the V2X sidelink or NR V2X.

The V2X communication can be applied to a variety of services, such as a forward collision warning, an automatic parking system, cooperative adaptive cruise control (CACC), a control loss warning, a traffic queue warning, a vulnerable road user safety warning, an emergency vehicle alarm, a speed warning when driving a curved road, traffic flow control, and the like.

The V2X communications may be provided through a PC5 interfaces and/or a Uu interface. In a wireless communication system that assists the V2X communication, there may be specific network entities for assisting communication between the vehicle and any entity. For example, the network entity may be the BS (eNB), the road side unit (RSU), the UE, or the application server (e.g., traffic safety server).

Furthermore, the UE performing the V2X communication may mean not only a general hand-held UE (UE) but also a V-UE (Vehicle UE), a pedestrian UE, a BS-type (eNB type) RSU or a UE-type RSU, a robot provided with a communication module, or the like.

The V2X communications may be performed directly between the UEs or through the network entity(ies). V2X operation modes may be classified according to the performance scheme of the V2X communication.

The V2X communications is required to support the pseudonymity and privacy of the UE in the use of the V2X application, so that an operator or a third party cannot track the UE identifier within an area where the V2X is supported.

The terms frequently used in the V2X communication are defined as follows:

RSU (Road Side Unit): the RSU is a V2X serviceable apparatus that can transmit/receive with a moving vehicle, using a V2I service. Further, the RSU, which is a fixed infra entity that supports the V2X application, can exchange messages with other entity that supports the V2X application. The RSU is a term frequently used in the existing ITS specification, and the reason for introducing this term to the 3GPP specification is to make it easier to read a document in the ITS industry. The RSU is a logical entity which combines a V2X application logic with a function of the BS (referred to as the BS-type RSU) or UE (referred to as the UE-type RSU).

V2I service: a type of the V2X service whose entities are a vehicle on one side and an infrastructure on another side.

V2P service: a type of the V2X service whose entities are a vehicle on one side and a personal portable device (e.g., a portable UE carried by a pedestrian, a cyclist, a driver or a fellow passenger) on another side.

V2X service: a 3GPP communication service type related to a transmission or reception apparatus to a vehicle.

V2X enabled UE: the UE supporting the V2X service.

V2V service: a type of the V2X service, in which both sides of the communication are vehicles.

V2V communication range: a direct communication range between two vehicles participating in the V2V service.

The V2X application, referred to as Vehicle-to-Everything, has four types, i.e., (1) vehicle to vehicle (V2V), (2) Vehicle-to-Infra (V2I), (3) Vehicle-to-Network (V2N), and (4) Vehicle-to-Pedestrian (V2P), as looked over.

FIG. 11 exemplifies a resource allocation method in sidelink where the V2X is used.

In the sidelink, as shown in FIG. 11A, sidelink control channels (physical sidelink control channels, PSCCHs) different from each other may be separately allocated in the frequency domain, and sidelink shared channels (physical sidelink shared channels, PSSCHs) different from each other may be separately allocated. Alternatively, as shown in FIG. 11B, PSCCHs different from each other may be successively allocated in the frequency domain, and PSSCHs may be successively allocated in the frequency domain.

NR V2X

Support for V2V and V2X services has been introduced in LTE during 3GPP Releases 14 and 15 in order to expand the 3GPP platform to the automotive industry.

Requirements for support of enhanced V2X use cases are broadly summarized into four use case groups.

(1) Vehicle Platooning enables the vehicles to dynamically form a platoon travelling together. All the vehicles in the platoon obtain information from the leading vehicle to manage this platoon. These information allow the vehicles to drive more harmonically than in a normal direction, going to the same direction and travelling together.

(2) Extended sensors enables the exchange of raw or processed data gathered through local sensors or live video images among vehicles, road site units, pedestrian devices and V2X application servers. The vehicles can increase the perception of their environment beyond of what their own sensors can detect and have a more broad and holistic view of the local situation. High data transmission rate is one of the key characteristics.

(3) Advanced driving enables semi-automated or full-automated driving. Each vehicle and/or RSU shares its own perception data obtained from its local sensors with vehicles in proximity, and allows vehicles to synchronize and coordinate their trajectories or maneuvers. Each vehicle shares its driving intention with vehicles in proximity.

(4) Remote driving enables a remote driver or a V2X application to operate a remote vehicle for those passengers who cannot drive by themselves or remote vehicles located in dangerous environments. For a case where variation is limited and routes are predictable, such as public transportation, driving based on cloud computing may be used. High reliability and low latency are the main requirements.

5G communication technology described above may be combined with and applied to methods proposed in this to be described later, or may be provided to embody or clarify the technical features of the methods proposed in the invention.

As described above, an authentication procedure for vehicle boarding is essential in autonomous vehicles, but security issues may arise in accordance with the authentication methods. For example, in the case of passenger authentication through a sensor or a camera of an autonomous vehicle, difference in a recognition rate will occur depending on the external environment of the vehicle. Furthermore, a passenger with a recognition rate of less than 100% is unable to use a service of using an autonomous vehicle, and the impossibility of using such service results in a sharp decrease in reuse intention of the passenger, which in turn leads to decrease in profit of a service provider.

Methods and apparatuses according to examples of the invention may have road passenger information in the form of a blockchain, provide a driving option according to the authentication state of the autonomous vehicle, search a pre-driving route according to the authentication state, and change a setting for the authentication state and the driving option when obtaining a block for a passenger on each road while driving. Further, methods and apparatuses according to examples of the invention may record and manage passenger blockchain use information for each road, and limit vehicle allocation at the time of next vehicle allocation, based on the authentication state and blockchain use information of the passenger.

By providing methods and apparatuses for user authentication in an autonomous driving system as described above, the invention can increase the usefulness of authentication by overcoming a functional limitation of a sensor installed on an autonomous vehicle, increase passenger satisfaction by reducing the number of ride rejections caused by authentication problem of the autonomous vehicle, guarantee the passenger safety by providing the driving option according to the authentication state, and secure security of personal information by managing passenger information in the form of a secure blockchain.

That is, the invention provides a technology which varies the driving option according to the authentication state at the time of a passenger boarding in an autonomous vehicle, and, in which, in a case where the authentication is not completed 100%, by obtaining passenger information held by the infra apparatus around the road via the minimum amount of driving, authentication information is additionally collected.

Blockchain Configuration Method for Each Road

Several infra apparatuses (communication devices) installed on a single road configure information about vehicles which have driven on the corresponding road in a form of a blockchain, and distribute and store the information about vehicles configured in a form of a blockchain. For example, infra apparatuses may include a traffic light, an infra sensor, or a closed circuit television (CCTV). Further, information collected by the infra apparatus may include vehicle information, road traffic volume, vehicle passenger information, or vehicle destination.

Here, the blockchain means a system that distributedly stores some encrypted data in a plurality of apparatuses rather than stores it on a central server. In the example of the invention, the information distributedly stored in the infra apparatuses of the road is encrypted, and only the host (the passenger's terminal apparatus or vehicle) of the distributedly stored information holds a key which can decrypt the encrypted data. Here, driving information of a vehicle distributedly stored may include vehicle information, information about sensor use on the road (e.g., a use rate for each sensor, activation time rate of a particular sensor), an object recognition result, or a vehicle current travel distance. Information on other vehicle or other passenger configured in the blockchain cannot be obtained because it can be decrypted by a different key (algorithm).

Definition of the Authentication Rate

The authentication value (authentication rate) of a passenger, which numerically indicates the matching accuracy between authentication information of a caller permitted to board an autonomous vehicle by calling the autonomous vehicle with authentication data of the passenger who has boarded the autonomous vehicle, is determined according to a match level between the user basic information stored in the server or the autonomous vehicle and user authentication information entered. Here, caller basic information and the entered passenger authentication information include face recognition information, passenger personal information or fingerprints. If the stored user basic information and the entered user authentication information are not matched 100% (if the authentication value is not 1), an average value of the matching rates for respective authentication items may be determined as the authentication rate of the passenger. If the authentication rate is not 100%, the passenger authentication rate may be updated by collecting user specific information stored in the road infra apparatuses. Here, the user specific information may include a credit card use record, an Internet use record, or a road driving record. The user specific information is a record of use performed by the user in a section in which the vehicle is driven, and may be distributedly stored in the infra apparatuses installed in the section in which the vehicle is driven.

Driving Option Setting Method According to a Passenger Authentication Rate

The vehicle driving option (control settings) may be determined by the authentication rate of the user who are on board the autonomous vehicle. At this time, if the authentication rate is below the reference authentication rate (e.g., 60%), the driving by the user on board the vehicle is not permitted, as it may not be believed that the mismatch between the entered authentication information and stored user information is simply caused by sensor malfunction.

If the authentication rate is equal to or more than 60%, the driving option (driving setting) is stepwisely determined according to the authentication rate. Here, the driving option may include manual driving, speed control, cutting in (overtaking), maintaining a safe distance, or determining priority in an entry/exit section. For example, a control level may be divided into three stages according to the authentication rate as belows.

As a first stage, a minimum control stage for a case where the authentication rate is equal to or greater than 90% is a stage in which the driving option less directly related to safety and direct driving by a user are controlled. For example, at the minimum control stage, manual driving by the user is restricted, and the vehicle is controlled to have a low priority at the entry/exit road.

As a second stage, a partial control stage for a case where the authentication rate is equal to or greater than 75% and less than 90% is a stage in which driving options of several types which may cause a safety problem and direct driving by a user are controlled. For example, in some control stages, manual driving by the user, a cutting in function, and a safety distance change function are restricted.

As a third stage, a full control stage for a case where the authentication rate is equal to or greater than 60% and less than 75% is a stage in which driving options of all the types which may cause a safety problem and direct driving by a user are controlled. For example, at the full control stage, the vehicle speed is controlled to be at the lowest speed on the road on which it is driving, the cutting in function and the safety distance change function are controlled, and the vehicle is controlled to have a subordinated priority in the entry/exit section.

Driving Guide According to Passenger Authentication Rate when Boarding an Autonomous Vehicle When a user boards an autonomous vehicle, a passenger authentication procedure is performed for checking whether the user who has requested vehicle allocation and the user on board the vehicle match or not. Here, user authentication information used in the authentication procedure may include face recognition information, living body authentication information, fingerprint recognition information, or credit card authentication information. Based on the authentication value (authentication rate) which indicates the matching accuracy between the entered authentication information of the passenger on board the vehicle and the personal information of the caller or the vehicle, boarding guidance message is output and the initial driving setting of the vehicle (initial driving option) is determined.

For example, a case where the derived authentication value is less than the minimum reference value (e.g., 60%) is a case where the initial authentication has not been completed since the passenger authentication information is lacking or mismatches with the caller personal information. In this case, the reason that the authentication value less than the minimum reference value is derived is determined to be not due to the problem of the sensor but due to the mismatch between the passenger and the caller, and the driving of the vehicle which the current passenger is on beard is not allowed. At this time, the autonomous vehicle may output an authentication result guidance message to inform the passenger of the authentication result, and output an inquiry message asking the passenger whether to call another vehicle or not. If an input requesting a call of another vehicle occurs in response to the inquiry message, the autonomous vehicle may call another vehicle located closest to its current position. For example, the autonomous vehicle may transmit a vehicle allocation request message to a server, and the server may transmit the vehicle allocation request message to an idle autonomous vehicle that is located closest to the autonomous vehicle that has failed in the authentication. Here, the vehicle allocation request message may include information about the passenger who have failed in the authentication and the entered destination.

If the derived authentication value is equal to or greater than the minimum reference value (e.g., 60%) and less than the maximum value (e.g., 100%), additional authentication is required because the passenger authentication information matches with some part of the caller recognition information but does not match with it 100%. In this case, the autonomous vehicle may output an authentication result guidance message to inform the passenger of the partial authentication completion, and output information about the driving setting (driving control option) that includes the control level corresponding to the authentication value. Furthermore, the autonomous vehicle may output a pre-driving route inquiry message to ask whether to drive to a pre-driving route for further authentication, and output a user interface guiding the pre-driving route if there is any user approval.

Pre-Driving Route Guide for Additional Authentication

If it is accepted to change a route to the pre-driving route for updating the authentication value through further authentication, the autonomous vehicle transmits to a server a pre-driving route request message requesting to search the pre-driving route. The server checks the driving history (existing driving history) of the vehicle which the passenger was previously on board, based on the authentication information of the passenger who is on board the autonomous vehicle. Here, the server loads, among from the existing driving histories of the passenger, the existing driving history of the nearest section from the current position of the autonomous vehicle. The existing driving history includes the driving section for a period of time (e.g., the last week) and the authentication value during the driving.

The server determines a section of the existing driving history which has an authentication value greater than the current authentication value of the passenger, as the pre-driving route, and transmits information about the pre-driving route determined to the autonomous vehicle. The autonomous vehicle outputs a user interface which guides the pre-driving route received from the server.

At this time, if an input rejecting the pre-driving route occurs, the autonomous vehicle searches a section which has an authentication value higher than the current authentication value, through the server while driving in accordance with the driving setting corresponding to the current authentication value. If a section with a high authentication value is searched, the autonomous vehicle resets the section searched as the pre-driving route, and outputs a user interface which guides the pre-driving route reset. If the approval of the passenger is confirmed, the driving route is re-configured by incorporating the pre-driving route into the driving route to the destination entered by the passenger, and the driving is started along the driving route re-configured.

Method of Obtaining User Information of a Passenger when Entering the Pre-Driving Route When an autonomous vehicle enters a pre-driving route, it checks the presence of a data block containing the user information of its current passenger through Vehicle to Infrastructure (V2I) communication with infrastructures installed around the pre-driving route. If there is a data block containing the user information of the current passenger, the autonomous vehicle attempts to decrypt the data block using a key of the current passenger. If the decryption for the data block succeeds, the autonomous vehicle may update the authentication value using the user information contained in the data block. If the decryption for the data block fails, the autonomous vehicle transmits a decryption result message to the server containing a failure record of the decryption.

If the decryption result message contains a decryption failure record, the server checks a past decryption record of the autonomous vehicle. If the decryption failure is repeated several times by the autonomous vehicle, the server transmits a passenger error message to the autonomous vehicle. The passenger error message may include a message indicating that the autonomous vehicle cannot drive with the current passenger on board and the type of the current passenger. The type of the current passenger includes a general error passenger who boards a vehicle called by another person by a simple mistake and a dangerous passenger who habitually boards vehicles called by others.

The autonomous vehicle that has received the passenger error message may output a vehicle egress guidance message that guides the vehicle egress of the current passenger and allocation of another vehicle. Additionally, if, from the current passenger's blockchain access record, it is checked that authentication failure has repeatedly occurred by the current passenger, the server may limit the vehicle allocation for the current passenger. Here, the blockchain access record may include passenger information, decryption attempt time, decryption request section, decryption failure or success, or the number of vehicle egress due to decryption failure.

FIG. 12 is a drawing schematically showing a blockchain.

Block chain is a computing technology designed to make it difficult for malicious forces to arbitrarily manipulate by all the members verifying, storing and executing information and values over the network.

A key technology of the blockchain is the structure in which each keeps transaction records or information without the help of a third organization (Clearing House or Trusted Third Party, TTP) and transactions are established only at the time of joint authentication by the members. A blockchain is a block aggregate that connects blocks containing a number of transaction records and information, and is a chain structure in which each block is organically linked to a previous block by a hash value until the genesis block.

At this time, the block means a type of data packet that is connected chronologically by encrypting the contents of the information in a form of letters or numbers. A Block containing new information is connected at every certain time, and by verifying its validity in the process of block-to-block connection, it is possible to prevent falsification of information inside the blockchain.

Types of blockchains include Public Block Chain, Private Block Chain, Consortium Block Chain and the like.

The public blockchain, which is the first blockchain application case, may be opened and operated to everyone through the Internet, allows anyone to participate in notarization, and has characteristics holding cross-anonymity. The private blockchain is an individual type blockchain that only permitted users can access. A single entity may manage its internal network with blockchain and provide a platform service for developing corresponding chain. The consortium blockchain is an anti-central blockchain, which only a small number of pre-selected entities can participate in. There is a nature of participating in notarization through agreed rules among the entities, and of network scalability being excellent.

In the specification, the "blockchain" also refers to the public blockchain, the private blockchain or the consortium blockchain.

The core technology of blockchain is configured with four base technologies, such as a peer-to-peer (P2P) network, encryption, distributed ledger, and distributed agreement. Each technology is formed in a relation complementary to each other for decentralization, data integrity, or the like. Hereinafter, a blockchain technology which is combined with the key technologies of blockchain and the autonomous driving technology of a vehicle will be described.

P2P Network

Communication and connection between participants of the blockchain may be formed based on a P2P network. The P2P network is defined as an autonomous configuration system formed with autonomous peers with equivalent qualifications for the purpose of sharing distributed resources without the concept of centralized services.

P2P networks are largely classified as a structured P2P or a unstructured P2P. The unstructured P2P may further be classified as a 'centralized P2P network' that forms a network between participants around the server or a 'distributed P2P network' that is based on the flooding algorithm of the data. The Blockchain may use, but not limited to a flooding-based unstructured P2P network for the implementation of a decentralized distributed network.

The main characteristics of the P2P network are as follows: In terms of distributed resource sharing, the target resources of interest may be used in a distributed form, and may be located at a network end close to the peer. Each peer in a set of peers utilizes the resources provided by its counterpart peer, and the target resources include audio/video data, applications, computing power, computing resources, and so on. Peers are linked to each other by a network and can be distributed across the globe. In terms of distributed autonomous organization, each peer directly interacts with each other without separate centralized control or intervention for the use of shared resources. In terms of performance, there may be a case in which a centralization factor is introduced into a fully distributed P2P network, which is called a hybrid P2P network. For this, the server may be used as a centralization element, and especially a Mobile Edge Computing (MEC) server may take a role of it. Further, the hybrid P2P network with a certain peer as a centralization element may be configured. In the P2P network, each peer provides flexibility in terms of function availability by taking both roles of a client and a server. In addition, respective peers have equal qualification in terms of their functional role. Whether to share resources held by each peer or not follows the autonomous decision of the peer. In particular, in the invention, each of peers may be configured with an autonomous vehicle.

Encryption

In the encryption technology used in the blockchain, Merckle Tree technique and Digital Signature technique based on a public key may be used.

FIG. 13(a) is a drawing representing a Muckle Tree method in blockchain encryption technology.

Referring to FIG. 13(a), the Merkle tree is a kind of hash tree, and refers to a tree in which names of all the non-leaf nodes are configured with hashes of children nodes. A leaf node means data of a file or a specific value, and an upper node is configured with a hash of such leaf node. A root node of the muckle tree configured in this way may be formed of hash values of data of all the nodes constituting the tree. At this time, users can verify falsification of data only by verifying the hash of the root node. Therefore, in the blockchain, the foundation of the Merkle tree may be formed by inserting information about transaction or the like between participants into the leaf node. As a function used when forming the Merkle tree, there is SHA-256, but the configuration of the invention is not limited to this.

FIG. 13(b) is a drawing illustrating a digital signature method based on a public key in the blockchain encryption technology.

Referring to FIG. 13(b), an open key-based digital signature technique may be used in a field such as self-authentication or the like as an encryption technology that enables secure communication between participants who do not divide and have a secret key beforehand. In a public key based structure, there are a public key and a secret key, and the public key can be known by all participants, whereas the secret key can only be known by the corresponding owner. The user uses his/her own secret key to sign transaction and send transaction information to the blockchain network with his/her own corresponding public key. Later, other participants may verify the transaction validity through the public key of the sender.

Distributed Ledger

The distributed ledger is a memory of information that is replicated, shared and synchronized by agreement between participants. In order to apply the distributed ledger to the P2P network, consent of participants is required, and this is the same to the blockchain. In the blockchain, the distributed ledger stores all the occurring information through verification by participants, and all participants can hold the same information. When verifying information, only legitimate information is stored in the distributed ledger of the blockchain, after verifying the information and connectivity recorded in the distributed ledger held by the individual participants, and agreement of the participants.

At this time, information is accumulated for a period of time and stored on a block-by-block basis, and is stored on the distributed ledger with connectivity between blocks bestowed. The distributed ledger becomes a ground of the integrity of the data provided by the blockchain. The users who participate in the blockchain possess data of the same distributed ledger, and may exhibit better security effect against outside hacking or fabrication by a specific user. For example, in a case where a hacker attempts to falsify certain data, do double transaction or the like from outside, high costs and computing resources would be consumed because the hacking should be attempted for a majority of the distributed ledger owned by participants.

Distributed Agreement

Distributed agreement is protocol that elicits consent for specific data between processes or agents when there is a process having a combination in a field such as distributed computing, multi-agent system or the like. The distributed agreement protocol has properties of validity, integrity, agreement, and termination.

In the agreement algorithm, a proof of work (PoW) algorithm, a proof of stake (PoS) algorithm, a Delegated Proof of Stake (DPoS) algorithm, a Practical Byzntine Fault Tolerance (PBFT) algorithm, a Proof of Elapsed Time (PoET) algorithm, a Proof of Importance algorithm, a Proof of Authority (PoA) algorithm or the like may be used, and any designed algorithm other than these may be used.

Autonomous Driving of a Vehicle Using Blockchain

FIG. 14 is a drawing showing blockchain with an autonomous vehicle as a node.

Generation 1 blockchain and generation 2 blockchain recorded only cryptocurrency or simple transaction records on the block and used them, but the generation 3 blockchain can generate data by adding data and programming codes as its processing speed is improved and its storage capacity is increased. Therefore, blockchains can also be used in autonomous driving or IoT of a vehicle beyond financial transactions.

However, the scalability of the blockchain is too low to be directly applied to a vehicle system, and there may be a problem with throughput. As a result, a light blockchain may be used in an autonomous vehicle or Internet of Things (IoT). There is an LSB (Lightweight Scalable Blockchain) as a blockchain system that has been made lighter. The LSB is for a large scale network environment configured with nodes having limited computation capability, and at least one autonomous vehicle or IoT may participate therein. Respective nodes on the LSB network constitute a cluster by being gathered to a certain number, and one node serves as a cluster head. At this time, the cluster head can create and store a block of the blockchain.

At this time, other nodes participating in the cluster may perform only verification of the stored block. A node corresponding to the cluster head in the LSB may be referred to as an Overlay Block Manager (OBM). Respective transactions constituting a blockchain are transmitted, received and verified between OBMs, and there is no central control system like a regular blockchain. In fact, only the OBM participates in blockchain in the LSB, while other nodes take a centralized management method with the OBM as a center. Such network is referred to as an overlay network.

In particular, the blockchain may also be used in the platooning technology of a plurality of vehicles. If a plurality of vehicles are platooning, the vehicles can form a network and drive maintaining a constant distance therebetween. The vehicles formed to be a platoon may receive surrounding information through V2X (Vehicle to Everything) communication and use it for safe driving. In the platooning, a leading vehicle 1410 may be referred to as a LV (Leading Vehicle) and following vehicles 1420, 1430, 1440, 1450 following the LV may be referred to as Slave Vehicles (SVs) or Following Vehicles (FVs). In the specification, Leading Vehicle and "Leader Vehicle" may be used in place of each other, and Slave Vehicle or Flowing Vehicle and "child vehicle" may be used in place of each other.

At this time, a plurality of vehicles platooning in a platooning system using a blockchain may be regarded as blockchain nodes. The vehicles block data generated therefrom and transmit it to another platooning vehicle, and the data generated may also be transferred to a cloud server or a Mobile Edge Computing Server (MEC server). As a result, the original data can be checked through the cloud server or the MEC server even if at least one vehicle that is currently platooning or has ever platooned in the past is hacked, or even if data is falsified by a user.

At this time, a method of the transmission and reception of data between platooning vehicles may include broadcast, groupcast, unicast, or the like.

In an example of the invention, the blockchain system may include a blockchain network (BCN), and a server.

The blockchain network (BCN) may be configured with at least one node. The node may be a server 1460, a vehicle or an IoT apparatus other than these. Each node records information based on preset rules, transmits the recorded information to each blockchain server 1460, while at the same time the server 1460 can store and manage the information received. Each of the nodes may mean an autonomous vehicle.

In various examples of the invention, the node may not only record information based on preset rules, but also perform a function of the server 1460. Specifically, each node may add program codes to perform a function of generating and storing data.

In an example of the invention, the sever 1460 may include the cloud sever or the MEC server. The server 1460 may receive the transaction information from the vehicle to store and manage it. The transaction information may mean information about various events performed based on the blockchain. In particular, the transaction in the invention may be an event related to internal and external information of the autonomous vehicle which the autonomous vehicle has obtained through a sensing unit.

In a case where a network of autonomous vehicles provided with a blockchain like this is used, the internal and external information of the vehicles obtained from the each vehicle may be replicated, shared or synchronized in the server 1460 or a memory of another vehicle. Due to sharing of such information, the vehicle may effectively respond to information fabrication by an outside hacker or information fabrication of the user.

FIG. 15 shows an example of an autonomous driving system according to an exemplary embodiment of the invention.

Referring to FIG. 15, the autonomous driving system includes a vehicle 1510, a server 1530, and an infra apparatus 1550. The vehicle 1510, the server 1530, and the infra apparatus 1550 may exchange signals to each other through wired or wireless communication. For example, the communication between the vehicle 1510 and the server 1530, and the communication between the vehicle 1510 and the infra apparatus 1550 may be performed through the wireless communication, while the communication between the server 1530 and the infra apparatus 1550 may be performed through the wired communication.

The vehicle 1510 is a mechanical apparatus driving along a constant route using driving power, and the vehicle 1510 according to the example of the invention includes an autonomous vehicle capable of not only driving by a control of a passenger but also driving autonomously. The vehicle 1510 may be configured identically to the vehicle 10 shown in FIG. 5.

The sever 1530 is a apparatus that provides data related to the driving of the vehicle 1510 in the autonomous driving system, and may manage the driving record of the passenger and a vehicle call in the autonomous driving system.

The infra apparatus 1550 is apparatuses installed on a route (road network) on which vehicles drive in the autonomous driving system, and may distributedly store data block containing user information, and provide a data block in response to the request of the vehicle.

FIG. 16 shows an example of an apparatus for user authentication in an autonomous driving system according to an exemplary embodiment of the invention. A vehicle control apparatus shown in FIG. 16 may be included in the vehicle 1510 of FIG. 15. The apparatus for user authentication of FIG. 16 corresponds to an example of an apparatus for control of the vehicle 1510.

In FIG. 16, the apparatus for user authentication 1600 includes a communication unit 1610, a processor 1630 which controls functions of the vehicle, an input/output interface 1650 which provides input data to the processor 1630 or outputs data processed by the processor 1630, and a storage unit 1670 which stores the data processed by the processor 1630.

The communication unit 1610 is an apparatus configured such that the vehicle 1510 exchanges signals with another entity (e.g., another vehicle, the infra apparatus, a sever), and may be configured identically to the first communication apparatus 910, the second communication apparatus 920 of FIG. 1, or the communication apparatus 220 of FIG. 6. The communication unit 1610 according to an exemplary embodiment of the invention may receive encrypted data blocks related to a passenger of the vehicle 1510 from another apparatus (e.g., the infra apparatus 1550) located on the pre-driving route of the vehicle 1510. Further, if the decryption for the encrypted data blocks is failed, the communication unit 1610 transmits a failure record of the decryption to the server 1530, and receives the passenger error message indicating the passenger type from the server 1530.

The processor 1630 may control hardware components for performing functions of the vehicle 1510 by executing commands stored in the storage unit 1670. The processor 1630 may be configured identically to the main ECU 240 of FIG. 6, the processor 170 of FIG. 7, the main controller 370 of FIG. 10. The processor 1630 according to an exemplary embodiment of the invention obtains the authentication information entered by the passenger of the vehicle 1510, determines the authentication value indicating the matching accuracy between the authentication information entered and the personal information of the caller of the vehicle, determines the driving setting of the vehicle based on the authentication value, drives the pre-driving route according to the driving setting, receives through the communication unit 1610 the encrypted data blocks related to the passenger from other apparatuses located on the pre-driving route, performs a decryption procedure of the encrypted data blocks by using a key value of the passenger, and controls the vehicle 1510 to drive to the destination. The processor 1630 may control such that the vehicle 1510 (or the vehicle control apparatus 1600) performs actions to be described later by executing commands for performing methods to be explained below.

The input/output interface 1650 is an apparatus for providing entered data into the processor 1630 or outputting data processed by the processor 1630, and may include an output module such as a display, or speaker, and an input module such as a touch screen, a key pad, a mike, a fingerprint sensor, or a camera. For example, the input/output interface 1650 may be configured identically to the interface apparatus 200 of FIG. 6, the interface 180 of FIG. 7, or the input apparatus 310, the display system 350, or the interface unit 380 of FIG. 10. Further, the input/output interface 1650 may be connected to the communication unit 1610 and provide to the processor 1630 data provided by the an external apparatus such as a smart phone. Hereinafter, for convenience of description, the input/output interface is assumed to be a touch screen, and described as information being output through the display and being entered through the touch screen, and yet the invention is not limited to this, but may be applied to any exemplary embodiment in which a user interfaces through input or output.

The input/output interface 1650 according to an exemplary embodiment of the invention may receive an input of the authentication information of a passenger of the vehicle 1510, output the authentication failure message noticing authentication failure of the passenger if the authentication information of the passenger mismatches with the personal information of the caller, output the inquiry message on whether to call another vehicle or not, and transfer to the processor 1630 another vehicle call input of the passenger if receiving an input requesting a call of another vehicle. Further, if the passenger of the vehicle 1510 is confirmed to correspond to a dangerous passenger who intentionally boards the vehicle called by other caller, the input/output interface 1650 may output the vehicle allocation restriction guidance message informing that the vehicle allocation is restricted for the corresponding passenger.

The storage unit 1670 is an apparatus which stores the data processed by the processor 1630, and provides commands or data to the processor 1630, and may be configured identically to the memory 140 of FIG. 7 or the memory 340 of FIG. 10. The storage unit 1670 according to an exemplary embodiment of the invention may store commands which is executed by the processors 1630 so that methods to be described below can be performed by the vehicle 1510. Further, the storage unit 1670 may store information for the user authentication of the vehicle 1510.

FIG. 17 is a flowchart for the user authentication in an autonomous driving system according to an exemplary embodiment of the invention.

Referring to FIG. 17, at step S1705, the vehicle 1510 may determine and obtain the authentication value indicating the matching accuracy of the authentication data entered of the passenger of the vehicle 1510 and the authentication information of the caller of the vehicle 1510. For example, the authentication data may include face recognition data, fingerprint recognition data, living body authentication data (e.g., iris recognition data), or financial authentication data (e.g., credit card information). The authentication information of the passenger may be entered by the terminal apparatus (e.g., smart phone) of the passenger and then transmitted to the server 1530, and additionally transmitted from the server 1530 to the vehicle 1510. The input information of the passenger may be configured with a plurality of authentication data for each authentication item.

Further, the authentication value is a value for indicating whether the passenger who is currently on board the vehicle 1510 corresponds to a permitted user, and may be referred to as an authentication rate or a recognition rate. The authentication value may correspond to an average value of matching rates for each authentication item of the authentication data entered of the passenger and the authentication information of the caller. In an example, if the authentication value of any one item is not 100%, the average value of the matching rates for each authentication item may be determined as a final authentication value. For example, in a case where the face recognition matching rate is 78%, the caller personal information matching rate is 100%, and the fingerprint matching is 70%, an initial authentication value may be determined as 82.6%.

At step S1710, the vehicle 1510 may determine the driving setting of the vehicle 1510 based on the authentication value determined at step S1705. For example, if the authentication value is less than 0.6 (60%), the driving setting may be determined not to permit the passenger to be on board; and if the authentication value is equal to or greater than 0.6 and less than 1 (100%), additional authentication for the passenger may be determined as being necessary, and the driving setting may be determined as a state in which some functions are controlled.

In an example of the invention, the driving setting indicates a subset of driving functions of the vehicle 1510 whose manipulation by the passenger is controlled when the vehicle 1510 is driving, and for example, may include manual driving, speed control, cutting in (overtaking), safety distance maintenance, or priority determination at entry/exit section.

At step S1715, the vehicle 1510 may drive along the pre-driving route in accordance with the driving setting determined at step S1710. Here, the pre-driving route is a section on which the vehicle that the passenger was on boarded drove formerly, and is a route for performing additional authentication for the passenger using the blockchain data.

At step S1720, the vehicle 1510 performs decryption for the encrypted data blocks related to the passenger received from the infra apparatus 1550 located on the pre-driving route, using key value of the passenger. Several infra apparatuses installed on the road may configure driving vehicle information about vehicles driving on the corresponding road in a form of a blockchain, and distributedly store the driving vehicle information. For example, the infra apparatus 1550 may include a traffic light, an infra sensor, or CCTV. Further, the road driving vehicle information collected by the infra apparatuses 1550 may include vehicle information, road traffic volume, vehicle passenger information, or vehicle destination.

The blockchain refers to not a method in which multiple devices store data in the central server, but a system structure in which all the devices distributedly store parts of encrypted data.

Information distributedly stored in infra apparatuses installed on one road has been encrypted, and only each of data entities (vehicle or passenger) holds a key capable of decrypting the corresponding password. The vehicle driving information distributedly stored may include vehicle information, sensor use rate on the corresponding road, object recognition result, or driving distance of the vehicle.

For example, in a case where the vehicle 1510 whose the plate number is 41DUxxxx has driven on Yangjae-daero, the driving information of the vehicle may be encrypted and stored in a traffic light and CCTV of the corresponding road, and later, if the data stored in the blockchain of the road is attempted to use, the driving information of the vehicle may be obtained using the key of the blockchain of the vehicle corresponding to plate number 41DUxxxx. At this time, other vehicles cannot obtain the data of the vehicle 1510 corresponding to plate number 41DUxxxx because they do not know the key of the vehicle 1510 corresponding to plate number 41DUxxxx.

In an example of the invention, the vehicle 1510 may distributedly store the user information of the passenger in infra apparatuses 1550 installed on the road while driving on the road. The user information distributedly stored in infra apparatuses 1550 may include credit card use history, driving change record, Internet use record, credit card use record, or road driving record. Here, the data block stored in each infra apparatus 1550 may include passenger information, use information of the passenger, authentication value of the passenger. For example, the data block may configured in a form of such as "sam/credit card_buying_shoes/80%".

At steps S1725 and S1730, the vehicle 1510 may determine the destination of the vehicle based on whether the decryption of the encrypted data blocks succeeds or fails, and drive to the destination. In a case where the decryption for the encrypted data blocks succeeds, the vehicle 1510 may update the driving setting by updating the initial authentication value, using user information contained in the data block, and drive to the destination entered.

For example, if the initial authentication value is less than 100%, the vehicle 1510 may update the authentication value of the passenger through collecting user information of the passenger contained in the encrypted data blocks. Here, the user information may include a credit card use record, an Internet use record, or a road driving record. For example, if the authentication value is updated through check of the Internet use record at the initial authentication value of 82.6%, the final authentication value of the passenger may be updated from 82.6% to 92.6%.

FIG. 18 is a flowchart showing an example of a step of determining the driving setting of the vehicle in an autonomous driving system according to an exemplary embodiment of the invention. FIG. 18 illustrates an example of step S1710 of FIG. 17.

At step S1805, the vehicle 1510 compares the authentication value with a minimum reference value for determining whether the vehicle 1510 is allowed to drive or not. For example, the minimum reference value may be determined taking into consideration authentication error by a sensor of the vehicle 1510, and a specific value (e.g., 60%) may be preset for the vehicle 1510.

At step S1810, if the authentication value is equal to or greater than the minimum reference value, the vehicle 1510 may determine a control level corresponding to the authentication value. If the authentication value is 100%, the authentication succeeds and thus, normal driving is performed. Contrarily, if the authentication value is equal to or greater than the minimum reference value (60%) and less than 100%, the vehicle 1510 may drive on a pre-driving route according to a control level corresponding to the authentication value while searching a pre-driving route for additional authentication.

Further, the vehicle 1510 may output to the passenger a message that informs the authentication result. For example, it may be "Certification rate of current passenger in the vehicle 1510 is 78%." A message such as "Although vehicle boarding and driving to the destination is possible, driving of a restricted form is provided because the match is not 100%." may be output.

Further, the vehicle 1510 may guide to the passenger a driving control option restricted based on the current authentication value. For example, a message such as "The restricted driving control option is passive driving/cutting in function/safety distance change." may be output.

Further, the vehicle 1510 may output an inquiry message about configuration of pre-driving route for additional authentication. For example, it may be "To release the driving control option, the current authentication rate update is required." A message such as "Do you want to re-configure a route for collecting authentication information?" may be output.

At step S1815, if the authentication value is less than the minimum reference value, the vehicle 1510 prevents the vehicle 1510 from driving. That is, if the authentication value of the current passenger is less than the minimum reference value, the vehicle 1510 determines that it is not a simple sensor error, and does not permit the driving of the vehicle 1510 by the current passenger.

FIG. 19 is a flowchart showing an example of a step of preventing the driving of the vehicle in an autonomous driving system according to an exemplary embodiment of the invention. FIG. 19 illustrates an example of step S1815 of FIG. 18.

At step S1905, the vehicle 1510 outputs the authentication failure notification message notifying the authentication failure of the passenger. For example, the authentication failure notification message is "the authentication rate of the current passenger is 55%." It may be configured as "Vehicle boarding is prevented due to not being an expected passenger."

At step S1910, the vehicle 1510 outputs the inquiry message about whether to call another vehicle or not. For example, the inquiry message may be configured as "If you want to board, you can call a vehicle located closest from current passenger. If you call, it is expected to arrive in one minute. Do you call?"

At step S1915, the vehicle 1510 determines whether an input requesting another vehicle occurs or not. The vehicle 1510 checks whether the input requesting anther vehicle through the interface 1650 occurs or not, and if no input occurs for a predetermined period of time, it waits for the vehicle egress of the passenger.

At step S1920, if the input requesting a substitute vehicle occurs, the vehicle 1510 transmits to the server a vehicle allocation request message requesting call of a substitute vehicle. For example, the vehicle allocation request message may contain the passenger information and the destination information.

FIG. 20 is a flowchart showing an example of a process of driving to the destination determined according to whether the decryption succeeds or fails in an autonomous system according to an exemplary embodiment of the invention. FIG. 20 illustrates an example of step S1725 of FIG. 17.

At step S2005, the vehicle 1510 determines whether the decryption of data blocks received from the infra apparatuses succeeds or fails, using the key value of the passenger. The key value of the passenger is a unique value established for the passenger, and if the decryption through the key value is succeeds, the use record of the passenger can be obtained.

At steps S2010 and S2015, if the decryption succeeds, the vehicle 1510 updates the authentication value, using the use record of the passenger contained in the data blocks, and updates the driving setting, using the authentication value updated. For example, in a case where the passenger has passed through the pre-driving route formerly, the streaming service connection history when passing through the pre-driving route may be stored in the infra apparatuses in a form of a blockchain, and the vehicle 1510 may use the streaming service connection history contained in the data blocks decrypted to update the authentication value. Further, if the authentication value update occurs, the vehicle 1510 may output a message informing the authentication value update (e.g.: "It has been checked whether the passenger matches or not, based on youtube connection history on the corresponding road. The authentication rate is updated").

At step S2020, if the decryption fails, the vehicle 1510 performs vehicle egress procedure of the passenger. When determining that additional authentication is impossible due to the decryption failure, the vehicle 1510 does not permit the driving by the passenger and may perform the vehicle egress procedure. Here, the decryption failure may mean that the decryption has failed more times than a reference number of times (e.g., three times).

FIGS. 21A to 21C are drawings for describing the request of encrypted data blocks and transmission procedure between the vehicle and the infra apparatus in an autonomous driving system according to an exemplary embodiment of the invention.

In FIG. 21*a*, the vehicle 1510 may request a traffic light 1550-1, which corresponds to the infra apparatus, for the encrypted data block which is the subject of the decryption, and may attempt to decrypt the encrypted data block by receiving the encrypted data block as in FIG. 21B. Additionally, the vehicle 1510 may request the CCTV 1550-2, which is another infra apparatus, for the data block for additional authentication, and may receive the encrypted data block from the CCTV 1550-2.

FIG. 22 is a flowchart showing an example of a step of updating the driving setting in an autonomous driving system according to an exemplary embodiment of the invention. FIG. 22 illustrates an example of step S2015 of FIG. 20.

At step S2205, the vehicle 1510 determines the updated control level corresponding to the updated authentication value. For example, the control level according to the authentication value may be set as three stages (a minimum control stage, a partial control stage, a full control stage), and the driving options may be restricted according to each control level. The driving option to be controlled may include manual driving, speed control, cutting in (overtaking), maintaining a safe distance, or determining priority in an entry/exit section.

At step S2210, the vehicle 1510 may set as the destination a location designated by the passenger according to the updated control level. For example, if the updated authentication value is 100%, the vehicle 1510 may drive normally to the destination which the passenger enters; and if the updated authentication value is less than 100%, it may drive to a destination according to the control level corresponding to the updated authentication value. For example, in a case where the initial authentication value of the passenger is 70%, and yet the authentication value is updated to 100% through the use record obtained on the pre-driving route, the vehicle 1510 may drive normally to the destination.

FIG. 23 shows an example of a user interface indicating the updated driving setting in an autonomous driving system according to an exemplary embodiment of the invention.

Referring to FIG. 23, the authentication value of the current passenger (Sam) is 70%, which is greater than the minimum reference value, and yet is a state in which authentication is not made 100%. In this case, the vehicle 1510 may output a message guiding the passenger to drive to the pre-driving route on which additional authentication is possible. If approval input of the passenger occurs, the vehicle 1510 may check the use record of the passenger through the decryption for the data block received from the infra apparatus 1550 installed on the pre-driving route while driving on the pre-driving route, and may use the use record to perform the update for the authentication value.

That is, as shown in FIG. 23, if the current authentication value of the passenger is not 100% but 70%, the vehicle 1510 does not drive directly to the destination but drives along the pre-driving route, and in a case where the authentication value is updated to 100% through the use record of the passenger obtained while driving along the pre-driving route, the vehicle may drive normally to the destination.

FIG. 24 is a flowchart showing an example of performing the vehicle egress procedure in an autonomous driving system according to an exemplary embodiment of the invention. FIG. 24 shows an example of step S2020 of FIG. 20.

At step S2405, the vehicle 1510 uploads the failure record of the decryption to the server 1530. If the decryption for the data block received from the infra apparatus 1550 fails, the vehicle 1510 may transmit information about the passenger information and the corresponding data block to the server 1530.

At step S2410, the vehicle 1510 determines whether the passenger error message indicating the type of the passenger is received from the server 1530. If the passenger error message is not received from the sever 1530, the vehicle 1510 may attempt additionally to decrypt the data block received or may receive another data block.

At step S2415, if the vehicle 1510 receives the passenger error message, it checks the type of the passenger contained in the passenger error message. The type of the passenger indicates that the passenger who wrongly boards the vehicle 1510 by a simple mistake or maliciously. The sever 1530 may determine the passenger type based on the number of times of decryption failure of the vehicles which the passenger boarded in the past by checking the past history of the passenger.

At step S2420, if the passenger corresponds to the general error passenger, the vehicle 1510 sets the destination to a stop location closest to the location of the vehicle. The vehicle 1510 may induce the passenger corresponding to the general error passenger who wrongly boards the vehicle 1510 to get off the vehicle by driving to the closest stop location.

At step S2425, if the passenger corresponds to the dangerous passenger, the vehicle 1510 sets the destination to a transfer spot where it is possible to board another vehicle. If the number of times of the decryption failure is greater than the reference number of times (e.g., three times), the server 123 may determine that the current passenger of the vehicle 1510 corresponds to a malicious passenger, and then may transmit to the vehicle 1510 the passenger error message containing a message indicating that the type of passenger corresponds to the dangerous passenger. For a case of a passenger corresponding to the dangerous passenger, the vehicle 1510 may set a transfer spot as the destination, and may induce the passenger to board another vehicle. In another exemplary embodiment of the invention, the sever 1530 may restrict the vehicle allocation for the passenger corresponding to the dangerous passenger.

FIG. 25 shows another example of an autonomous driving system according to an exemplary embodiment of the invention.

Referring to FIG. 25, the autonomous driving system includes a vehicle 2510, a vehicle allocation server 2530, and an infra in a road 2550.

The vehicle 2510, which corresponds to the vehicle 1510 of FIG. 15, may include a navigation module 2215, a driving setting module 2520, and an authentication module 2525.

The navigation module 2215 provides data related to the driving route of the vehicle 2510. The navigation module 2515 includes a traffic information service module 2516 providing traffic information of the current road network, map information 2517 stored in a storage apparatus (not shown) in the vehicle 2510 and providing a map of a certain location, and a route guidance service module 2518 providing a route for driving to the destination.

The driving setting module 2520 controls settings related to the driving of the vehicle 2510. The driving setting module 2520 includes a driving control module 2521 determining the driving setting differentially according to the authentication value of the current passenger, and a pre-driving route module 2522 receiving the pre-driving route for additional authentication in a case where the authentication value is not 100%.

The authentication module 2525 performs the authentication procedure of the vehicle 2510. The authentication module 2525 includes an authentication information transmission/reception module 2526 transmitting or receiving the authentication information to/from the vehicle allocation server 2530 or the infra in a road 2550, an authentication rate inference module 2527 for inferring whether the authentication information of the current passenger matches with the authentication information of a caller of the vehicle 2510, an authentication rate update module 2528 updating the authentication rate based on a record of the passenger stored in the infra in a road 2550, and a blockchain decryption module 2529 decrypting the encrypted data block provided from the infra in a road 2550.

The vehicle allocation sever 2530 is an apparatus which, in an autonomous driving system, allocates an autonomous vehicle to a user and manages the autonomous vehicles. The vehicle allocation server 2530 includes an authentication rate management module 2531 which manages authentication rate of a passenger being on board each vehicle, a vehicle allocation module 2532 which allocates vehicles to users, and a pre-driving route search module 2533 which searches a pre-driving route for additional authentication in a case where the authentication rate is not 100%.

The infra in a road 2550, which is apparatuses installed in the road network, includes a blockchain management module 2551 which stores records of respective users in a form of a blockchain.

FIG. 26 is another example of a flowchart for the user authentication in an autonomous driving system according to an exemplary embodiment of the invention.

At steps S2605 and S2610, the vehicle 2510 receives the passenger authentication request from the vehicle allocation server 2530, and infers the passenger authentication rate for the passenger. At step S2615, the vehicle 2510 determines whether the authentication rate is 100% or not. If the authentication rate is 100%, the vehicle 2510 completes the authentication and drives normally to the destination; and if the authentication rate is not 100%, the vehicle 2510 proceeds to step S2620 to request the pre-driving route search.

At steps S2620 and S2625, the vehicle 2510 may request the pre-driving route search through the vehicle allocation server 2530, and may ask the passenger whether to drive on the pre-driving route when receiving the pre-driving route. At step S2630, the vehicle 2510 may change the driving option according to the authentication rate while driving on the pre-driving route.

At steps S2635, S2640 and S2645, the vehicle 2510 starts to drive on the pre-driving route, obtains a passenger block from the infra in a road 2550 which exists on the road, and performs decryption for the block.

At step 2650, if the decryption for the passenger block succeeds, the vehicle 2510 proceeds to step S2655 to update the authentication rate. At step S2660, if the additional authentication rate update is necessary, the vehicle 2510 proceeds to step 2630 to drive on the pre-driving route according to the driving option of the authentication rate. At step S2660, if the additional authentication rate update is not necessary, the vehicle 2510 proceeds to S2695 and starts to drive along the shortest distance from the current location to the destination.

At step S2650, if the decryption fails, the vehicle 2510 proceeds to step S2665 to upload the decryption failure record to the vehicle allocation sever 2530. At step S2670, if the vehicle 2510 does not receive the passenger error message from the vehicle allocation server 2530, the vehicle 2510 proceeds to step 2635 to drive on another pre-driving route. At step S2670, if the vehicle 2510 receives the passenger error message from the vehicle allocation server 2530, the vehicle 2510 checks the passenger error message, proceeds to steps S2675 and S2680 to check that the passenger corresponds to the dangerous passenger and set the transfer spot as the destination while at the same time guiding the transfer to another vehicle and vehicle allocation. At step S2670, if the vehicle 2510 receives the passenger error message from the vehicle allocation server 2530, the vehicle 2510 checks the passenger error message, proceeds to steps S2685 and S2690 to check that the passenger corresponds to the general error passenger and set the closest parking and stopping area as the destination for stopping the driving of the current vehicle. Whether the passenger corresponds to the dangerous passenger or the general error passenger may be checked through the passenger error message. Later, at step S2695, the vehicle 2510 may drive along the shortest distance from the current location to the destination.

In the autonomous driving system according to an exemplary embodiment of the invention, methods for user authentication of a vehicle, and apparatuses thereof are summarized as follows.

Example 1

A method for user authentication of a vehicle in an autonomous system includes: determining an authentication value indicating matching accuracy of authentication data entered for a passenger of the vehicle and authentication information of a caller of the vehicle; determining a driving setting of the vehicle based on the authentication value; driving on a pre-driving route according to the driving setting; performing decryption for encrypted data blocks related to the passenger received from an infra apparatus located on the pre-driving route, using a key value of the passenger; determining a destination of the vehicle based on whether the decryption for the encrypted data blocks succeeds or fails; and driving to the destination.

Example 2

In the method of Example 1, the authentication value corresponds to an average of matching rates for each authentication item of the authentication data entered of the passenger and the authentication information of the caller, and the authentication item includes face recognition information, living body authentication information or financial authentication information.

Example 3

In the method of Example 1, the determining of the driving setting includes: comparing the authentication value with a minimum reference value for determining whether the vehicle is allows to drive or not, determining a control level corresponding to the authentication value if the authentication value is equal to or greater than the minimum reference value, and preventing the vehicle from driving if the authentication value is less than the minimum reference value.

Example 4

In the method of Example 3, the preventing of the vehicle from driving includes: outputting an authentication failure notification message notifying authentication failure of the passenger, outputting an inquiry message about whether to call another vehicle or not, determining whether an input requesting another vehicle occurs or not, and transmitting to a server a vehicle allocation request message requesting a call of a substitute vehicle if the input requesting a substitute vehicle occurs.

Example 5

In the method of Example 1, the determining of the destination of the vehicle based on whether the decryption for the encrypted data blocks succeeds or fails includes: determining whether decryption of the data blocks succeeds or fails, using a key value of the passenger, updating the authentication value, using a use record of the passenger contained in the data blocks, and updating the driving setting, using the authentication value updated, if the decryption succeeds, and performing a vehicle egress procedure of the passenger if the decryption fails.

Example 6

In the method of Example 5, the updating of the driving setting includes: determining an updated control level corresponding to the updated authentication value, and setting as the destination a location designated by the passenger according to the updated control level.

Example 7

In the method of Example 1, the driving setting indicates setting of a subset of driving functions of the vehicle on which manipulation of the driver is controlled, and the driving functions includes manual driving, speed control, cutting in, maintaining a safe distance, or determining priority in an entry/exit section.

Example 8

In the method of Example 5, the performing of the vehicle egress procedure includes: uploading a failure record of the decryption to a server, determining whether a passenger error message indicating the type of the passenger is received from the server, checking the type of the passenger contained in the passenger error message when receiving the passenger error message, setting the destination to a stop location closest to a location of the vehicle if the passenger corresponds to the general error passenger, and setting the destination to a transfer spot where it is possible to board another vehicle if the passenger corresponds to the dangerous passenger.

Example 9

In the method of Example 8, the setting of the destination to a transfer spot where it is possible to board another vehicle includes outputting a vehicle allocation restriction guidance message informing vehicle allocation restriction for the passenger.

Example 10

In the method of Example 9, the vehicle allocation restriction guidance message is generated when a number of times of decryption failure of vehicles which the passenger has boarded is greater than a reference number of times.

Example 11

An apparatus for user authentication of a vehicle in an autonomous system includes: a communication unit which transmits or receives a signal of a vehicle; a processor combined with the communication unit; an input/output interface unit combined with the processor; and a storage unit combined with the processor, wherein the processor is set to determine an authentication value indicating matching accuracy of authentication data entered for a passenger of the vehicle and authentication information of a caller of the vehicle, determine a driving setting of the vehicle based on the authentication value, control the vehicle to drive on a pre-driving route according to the driving setting, perform decryption for encrypted data blocks related to the passenger received from an infra apparatus located on the pre-driving route, using a key value of the passenger, determine a destination of the vehicle based on whether the decryption for the encrypted data blocks succeeds or fails, and control the vehicle to drive to the destination.

Example 12

In the apparatus of Example 11, the authentication value corresponds to an average of matching rates for each authentication item of the authentication data entered of the passenger and the authentication information of the caller, and the authentication item includes face recognition information, living body authentication information or financial authentication information.

Example 13

In the apparatus of Example 11, the processor is set to compare the authentication value with a minimum reference value for determining whether the vehicle is allows to drive or not, determine a control level corresponding to the authentication value if the authentication value is equal to or greater than the minimum reference value, and prevent the vehicle from driving if the authentication value is less than the minimum reference value.

Example 14

In the apparatus of Example 13, the processor is set to output an authentication failure notification message notifying authentication failure of the passenger through the input/output interface unit, output an inquiry message about whether to call another vehicle or not through the input/output interface, determine whether an input requesting another vehicle occurs or not, and transmit to a server a vehicle allocation request message requesting a call of a substitute vehicle if the input requesting a substitute vehicle occurs.

Example 15

In the apparatus of Example 11, the processor is set to determine whether decryption of the data blocks succeeds or fails, using a key value of the passenger, update the authentication value, using a use record of the passenger contained in the data blocks, and updating the driving setting, using the authentication value updated, if the decryption succeeds, and perform a vehicle egress procedure of the passenger if the decryption fails.

Example 16

In the apparatus of Example 15, the processor is set to determine an updated control level corresponding to the updated authentication value, and set as the destination a location designated by the passenger according to the updated control level.

Example 17

In the apparatus of Example 11, the driving setting indicates setting of a subset of driving functions of the vehicle on which manipulation of the driver is controlled, and wherein the driving functions includes manual driving, speed control, cutting in, maintaining a safe distance, or determining priority in an entry/exit section.

Example 18

In the apparatus of Example 15, the processor is set to upload a failure record of the decryption to a server, determine whether a passenger error message indicating the type of the passenger is received from the server, check the type of the passenger contained in the passenger error message when receiving the passenger error message, set the destination to a stop location closest to a location of the vehicle if the passenger corresponds to the general error passenger, and set the destination to a transfer spot where it is possible to board another vehicle if the passenger corresponds to the dangerous passenger.

Example 19

In the apparatus of Example 18, the processor is set to output a vehicle allocation restriction guidance message informing the vehicle allocation restriction for the passenger through the input/output interface if the passenger corresponds to the dangerous passenger.

Example 20

In the apparatus of Example 19, the vehicle allocation restriction guidance message is generated when a number of times of decryption failure of vehicles which the passenger has boarded is greater than a reference number of times.

In an autonomous driving system according to an exemplary embodiment of the invention, advantageous effects of a method for user authentication and an apparatus thereof are described as follows.

The invention can embody a method for user authentication of high accuracy in an autonomous driving system and an apparatus thereof by performing the user authentication using not only entered information but also a blockchain technique.

Advantageous effects, which the invention may provide, are not limited to the aforementioned ones, and unmentioned or other ones may be understood from the following detailed description by a person having an ordinary skill in the art to which the invention belongs.

The above-described present invention can be implemented with computer-readable code in a computer-readable medium in which program has been recorded. The computer-readable medium may include all kinds of recording devices capable of storing data readable by a computer system. Examples of the computer-readable medium may include a hard disk drive (HDD), a solid state disk (SSD), a silicon disk drive (SDD), a ROM, a RAM, a CD-ROM, magnetic tapes, floppy disks, optical data storage devices, and the like and also include such a carrier-wave type implementation (for example, transmission over the Internet). Therefore, the above embodiments are to be construed in all aspects as illustrative and not restrictive. The scope of the invention should be determined by the appended claims and their legal equivalents, not by the above description, and all changes coming within the meaning and equivalency range of the appended claims are intended to be embraced therein.

What is claimed is:

1. A method for user authentication of a vehicle in an autonomous system, the method comprising:
   determining an authentication value indicating matching accuracy of authentication data entered for a passenger of the vehicle and authentication information of a caller of the vehicle;
   determining a driving setting of the vehicle based on the authentication value;
   driving on a pre-driving route according to the driving setting;
   performing decryption for encrypted data blocks related to the passenger received from an infra apparatus located on the pre-driving route, using a key value of the passenger;
   determining a destination of the vehicle based on whether the decryption for the encrypted data blocks succeeds or fails; and
   controlling the vehicle to drive to the destination.

2. The method of claim 1, wherein the authentication value corresponds to an average of matching rates for each authentication item of the authentication data entered of the passenger and the authentication information of the caller, and
   wherein the authentication item includes face recognition information, living body authentication information or financial authentication information.

3. The method of claim 1, wherein the determining of the driving setting includes:
   comparing the authentication value with a minimum reference value for determining whether the vehicle is allows to drive or not,
   determining a control level corresponding to the authentication value if the authentication value is equal to or greater than the minimum reference value, and
   preventing the vehicle from driving if the authentication value is less than the minimum reference value.

4. The method of claim 3, wherein the preventing of the vehicle from driving includes:
- outputting an authentication failure notification message notifying authentication failure of the passenger,
- outputting an inquiry message about whether to call another vehicle or not,
- determining whether an input requesting another vehicle occurs or not, and
- transmitting to a server a vehicle allocation request message requesting a call of a substitute vehicle if the input requesting a substitute vehicle occurs.

5. The method of claim 1, wherein the determining of the destination of the vehicle based on whether the decryption for the encrypted data blocks succeeds or fails includes:
- determining whether decryption of the data blocks succeeds or fails, using a key value of the passenger,
- updating the authentication value, using a use record of the passenger contained in the data blocks, and updating the driving setting, using the authentication value updated, if the decryption succeeds, and
- performing a vehicle egress procedure of the passenger if the decryption fails.

6. The method of claim 5, wherein the updating of the driving setting includes:
- determining an updated control level corresponding to the updated authentication value, and
- setting as the destination a location designated by the passenger according to the updated control level.

7. The method of claim 1, wherein the driving setting indicates setting of a subset of driving functions of the vehicle on which manipulation of the driver is controlled, and
wherein the driving functions includes manual driving, speed control, cutting in, maintaining a safe distance, or determining priority in an entry/exit section.

8. The method of claim 5, wherein the performing of the vehicle egress procedure includes:
- uploading a failure record of the decryption to a server,
- determining whether a passenger error message indicating the type of the passenger is received from the server,
- identifying the type of the passenger contained in the passenger error message when receiving the passenger error message,
- setting the destination to a stop location closest to a location of the vehicle if the passenger corresponds to the general error passenger, and
- setting the destination to a transfer spot where it is possible to board another vehicle if the passenger corresponds to the dangerous passenger.

9. The method of claim 8, wherein the setting of the destination to a transfer spot where it is possible to board another vehicle includes outputting a vehicle allocation restriction guidance message informing vehicle allocation restriction for the passenger.

10. The method of claim 9, wherein the vehicle allocation restriction guidance message is generated when a number of times of decryption failure of vehicles which the passenger has boarded is greater than a reference number of times.

11. An apparatus for user authentication of a vehicle in an autonomous system, the apparatus comprising:
- a communication unit which transmits or receives a signal of a vehicle;
- a processor coupled to the communication unit;
- an input/output interface unit combined with the processor; and
- a storage unit combined with the processor, wherein the processor is configured to
- determine an authentication value indicating matching accuracy of authentication data entered for a passenger of the vehicle and authentication information of a caller of the vehicle,
- determine a driving setting of the vehicle based on the authentication value,
- control the vehicle to drive on a pre-driving route according to the driving setting,
- perform decryption for encrypted data blocks related to the passenger received from an infra apparatus located on the pre-driving route, using a key value of the passenger,
- determine a destination of the vehicle based on whether the decryption for the encrypted data blocks succeeds or fails, and
- control the vehicle to drive to the destination.

12. The apparatus of claim 11, wherein the authentication value corresponds to an average of matching rates for each authentication item of the authentication data entered of the passenger and the authentication information of the caller, and
wherein the authentication item includes face recognition information, living body authentication information or financial authentication information.

13. The apparatus of claim 11, wherein the processor is configured to
- compare the authentication value with a minimum reference value for determining whether the vehicle is allows to drive or not,
- determine a control level corresponding to the authentication value if the authentication value is equal to or greater than the minimum reference value, and
- prevent the vehicle from driving if the authentication value is less than the minimum reference value.

14. The apparatus of claim 13, wherein the processor is configured to
- output an authentication failure notification message notifying authentication failure of the passenger through the input/output interface unit,
- output an inquiry message about whether to call another vehicle or not through the input/output interface,
- determine whether an input requesting another vehicle occurs or not, and
- transmit to a server a vehicle allocation request message requesting a call of a substitute vehicle if the input requesting a substitute vehicle occurs.

15. The apparatus of claim 11, wherein the processor is configured to
- determine whether decryption of the data blocks succeeds or fails, using a key value of the passenger,
- update the authentication value, using a use record of the passenger contained in the data blocks, and updating the driving setting, using the authentication value updated, if the decryption succeeds, and
- perform a vehicle egress procedure of the passenger if the decryption fails.

16. The apparatus of claim 15, wherein the processor is configured to
- determine an updated control level corresponding to the updated authentication value, and
- set as the destination a location designated by the passenger according to the updated control level.

17. The apparatus of claim 11, wherein the driving setting indicates setting of a subset of driving functions of the vehicle on which manipulation of the driver is controlled, and wherein the driving functions includes manual driving, speed control, cutting in, maintaining a safe distance, or determining priority in an entry/exit section.

18. The apparatus of claim 15, wherein the processor is configured to
upload a failure record of the decryption to a server,
determine whether a passenger error message indicating the type of the passenger is received from the server,
identify the type of the passenger contained in the passenger error message when receiving the passenger error message,
set the destination to a stop location closest to a location of the vehicle if the passenger corresponds to the general error passenger, and
set the destination to a transfer spot where it is possible to board another vehicle if the passenger corresponds to the dangerous passenger.

19. The apparatus of claim 18, wherein the processor is configured to output a vehicle allocation restriction guidance message informing the vehicle allocation restriction for the passenger through the input/output interface if the passenger corresponds to the dangerous passenger.

20. The apparatus of claim 19, wherein the vehicle allocation restriction guidance message is generated when a number of times of decryption failure of vehicles which the passenger has boarded is greater than a reference number of times.

* * * * *